United States Patent
Knoppert et al.

(10) Patent No.: US 10,747,264 B1
(45) Date of Patent: Aug. 18, 2020

(54) HINGE ACTIONS AND VIRTUAL EXTENDED DISPLAY MODES FOR MULTI-FORM FACTOR INFORMATION HANDLING SYSTEM (IHS)

(71) Applicant: Dell Products, L.P., Round Rock, TX (US)

(72) Inventors: Michiel Sebastiaan Emanuel Petrus Knoppert, Amsterdam (NL); Mark R. Ligameri, Santa Rosa, FL (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/374,609

(22) Filed: Apr. 3, 2019

(51) Int. Cl.
G06F 1/16 (2006.01)

(52) U.S. Cl.
CPC .......... *G06F 1/1616* (2013.01); *G06F 1/1641* (2013.01); *G06F 1/1652* (2013.01); *G06F 1/1669* (2013.01); *G06F 1/1681* (2013.01)

(58) Field of Classification Search
CPC .... G06F 1/1616; G06F 1/1641; G06F 1/1652; G06F 1/1681; G06F 1/1669
See application file for complete search history.

(56) References Cited

U.S. PATENT DOCUMENTS

| | | |
|---|---|---|
| 5,739,810 A | 4/1998 | Merkel |
| 5,847,698 A | 12/1998 | Reavey et al. |
| 6,510,048 B2 | 1/2003 | Rubenson et al. |
| 6,700,773 B1 | 3/2004 | Adriaansen et al. |
| 6,922,333 B2 | 7/2005 | Weng et al. |
| 7,061,472 B1 | 7/2006 | Schweizer et al. |
| 7,551,428 B2 | 7/2009 | Homer et al. |
| 7,663,602 B2 | 2/2010 | Jones et al. |
| 7,990,702 B2 | 8/2011 | Tracy et al. |
| 7,991,442 B2 | 8/2011 | Kim |
| 8,310,823 B2 | 11/2012 | Stoltz |
| 8,331,098 B2 | 12/2012 | Leung |
| 8,803,816 B2 | 8/2014 | Kilpatrick, II et al. |
| 8,988,876 B2 | 3/2015 | Corbin et al. |
| 9,524,030 B2 * | 12/2016 | Modarres ................ G06F 3/016 |
| 9,684,342 B2 | 6/2017 | Kim et al. |
| 9,740,237 B2 | 8/2017 | Moore et al. |
| 9,874,908 B2 | 1/2018 | Han et al. |
| 2004/0001049 A1 | 1/2004 | Oakley |
| 2006/0183505 A1 | 8/2006 | Willrich |
| 2009/0244016 A1 | 10/2009 | Casparian et al. |

(Continued)

OTHER PUBLICATIONS

Binary Fortress Software, "Precise Monitor Controls," 2017-2018, 2 pages, retrieved Oct. 15, 2018, available at https://www.displayfusion.com/Features/MonitorConfig/.

(Continued)

*Primary Examiner* — Muhammad N Edun
(74) *Attorney, Agent, or Firm* — Fogarty LLP

(57) ABSTRACT

Systems and methods for hinge actions and virtual extended display modes for a multi-form factor Information Handling System (IHS) are described. In an embodiment, an IHS may include: a processor; and a memory coupled to the processor, the memory having program instructions stored thereon that, upon execution by the processor, cause the IHS to: detect a change in an angle of a hinge coupling a first display to a second display; and in response to the detection, provide a Graphical User Interface (GUI) feature.

17 Claims, 18 Drawing Sheets

(56) References Cited

U.S. PATENT DOCUMENTS

| | | | |
|---|---|---|---|
| 2010/0238620 A1 | 9/2010 | Fish | |
| 2010/0321275 A1 | 12/2010 | Hinckley et al. | |
| 2015/0103014 A1 | 4/2015 | Kim et al. | |
| 2015/0227225 A1* | 8/2015 | Park | G06F 1/1641 345/173 |
| 2017/0069299 A1 | 3/2017 | Kwak et al. | |
| 2017/0255320 A1 | 9/2017 | Kumar et al. | |
| 2017/0344120 A1 | 11/2017 | Zuniga et al. | |
| 2018/0088632 A1 | 3/2018 | Dreessen et al. | |
| 2018/0121012 A1 | 5/2018 | Asrani | |
| 2018/0129391 A1 | 5/2018 | Files et al. | |
| 2018/0188774 A1 | 7/2018 | Ent et al. | |
| 2018/0232010 A1 | 8/2018 | Kummer et al. | |

OTHER PUBLICATIONS

Microsoft, "ChangeDisplaySettingsExA function," 7 pages, retrieved Oct. 15, 2018, available at https://msdn.microsoft.com/en-us/library/dd183413(v=vs.85).aspx VS. https://docs.microsoft.com/en-us/windows/desktop/api/winuser/nf-winuser-changedisplaysettingsexa.

Microsoft, "SendKeys.Send(String) Method," 6 pages, retrieved Oct. 11, 2018, available at https://msdn.microsoft.com/en-us/library/system.windows.forms.sendkeys.send(v=vs.110).aspx.

Microsoft, "DoDragDrop function," 4 pages, retrieved Oct. 11, 2018, available at https://msdn.microsoft.com/en-us/library/windows/desktop/ms678486(v=vs.85).aspx.

Microsoft, "System Events and Mouse Messages," published May 30, 2018, 4 pages, retrieved Oct. 11, 2018, available at https://msdn.microsoft.com/en-us/library/windows/desktop/ms703320(v=vs.85).aspx.

Microsoft, "InkSystemGesture Enumeration," 3 pages, retrieved Oct. 11, 2018, available at https://msdn.microsoft.com/en-us/library/windows/desktop/ms695579(v=vs.85).aspx.

Microsoft, "GetWindowRect function," 3 pages, retrieved Oct. 11, 2018, available at https://msdn.microsoft.com/en-us/library/windows/desktop/ms633519(v=vs.85).aspx.

Microsoft, "PointerRoutedEventArgs Class," 9 pages, retrieved Oct. 11, 2018, available at https://docs.microsoft.com/en-us/uwp/api/Windows.UI.Xaml.Input.PointerRoutedEventArgs#Windows_UI_Xaml_Input_PointerRoutedEventArgs_GetCurrentPoint_Windows_UI_Xaml_UIElement_.

Microsoft, "SetWindowPos function," 7 pages, retrieved Oct. 11, 2018, available at https://msdn.microsoft.com/en-us/library/windows/desktop/ms633545(v=vs.85).aspx.

Microsoft, "Time Functions," published May 30, 2018, 5 pages, retrieved Oct. 11, 2018, available at https://msdn.microsoft.com/en-us/library/windows/desktop/ms725473(v=vs.85).aspx.

Microsoft, "Flow Do I Detect a Window Open Event," 11 pages, retrieved Oct. 15, 2018, available at https://social.msdn.microsoft.com/Forums/vstudio/en-US/1953f400-6f1c-49e0-a63e-d724bccc7676/how-do-i-detect-a-window-open-event?forum=csharpgeneral.

Microsoft, "How Do I Maximize/Minimize Applications Programmatically in C#?," 2 pages, retrieved Oct. 15, 2018, available at https://social.msdn.microsoft.com/Forums/vstudio/en-US/9bde4870-1599-4958-9ab4-902fa98ba53a/how-do-i-maximizeminimize-applications-programmatically-in-c?forum=csharpgeneral.

Microsoft, "WinMain Entry Point," 7 pages, retrieved Oct. 15, 2018, available at https://msdn.microsoft.com/en-us/library/ms633559(vs.85).aspx.

Stack Overflow, "How Can I Split a Window in Two in Windows API," 6 pages, retrieved Oct. 15, 2018, available at https://stackoverflow.com/questions/10467112/how-can-i-split-a-window-in-two-in-windows-api.

Microsoft, "Application User Model IDs (AppUserModelIDs)," published May 30, 2018, 8 pages, retrieved Oct. 15, 2018, available at https://docs.microsoft.com/en-us/windows/desktop/shell/appids.

Microsoft, "Mouse Events in Windows Forms," published Mar. 29, 2017, 6 pages, retrieved Oct. 15, 2018, available at https://docs.microsoft.com/en-us/dotnet/framework/winforms/mouse-events-in-windows-forms.

\* cited by examiner

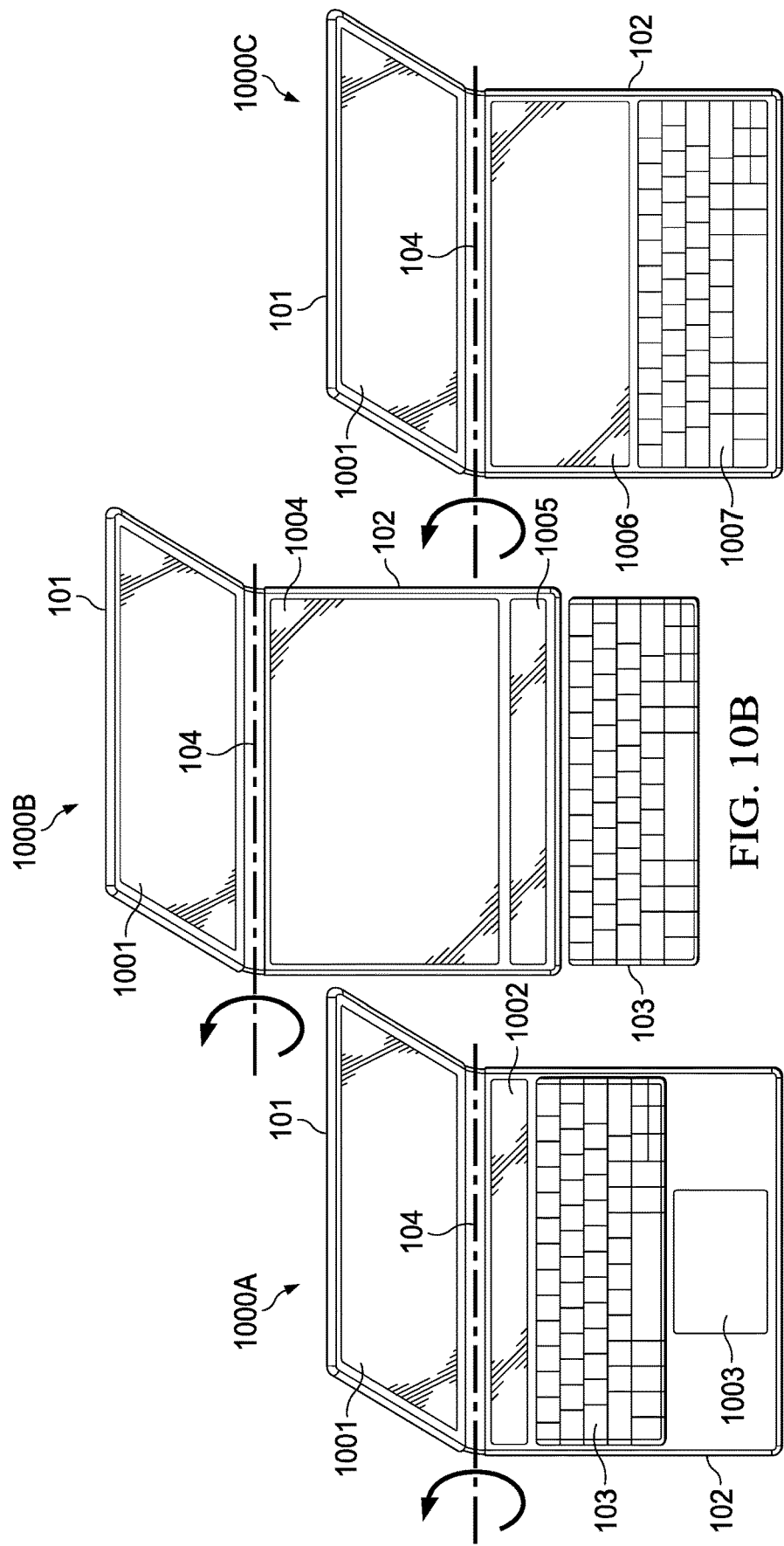

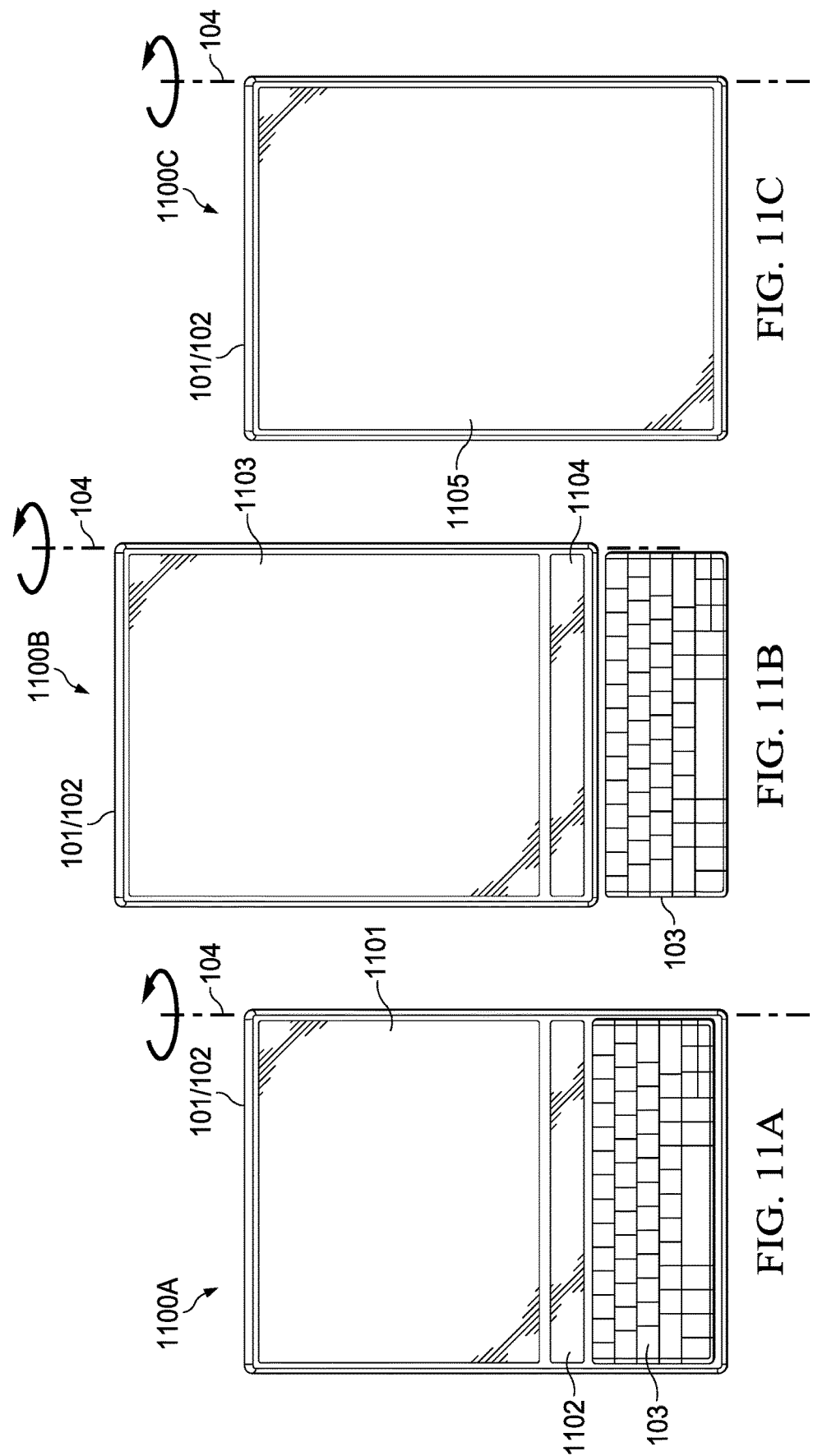

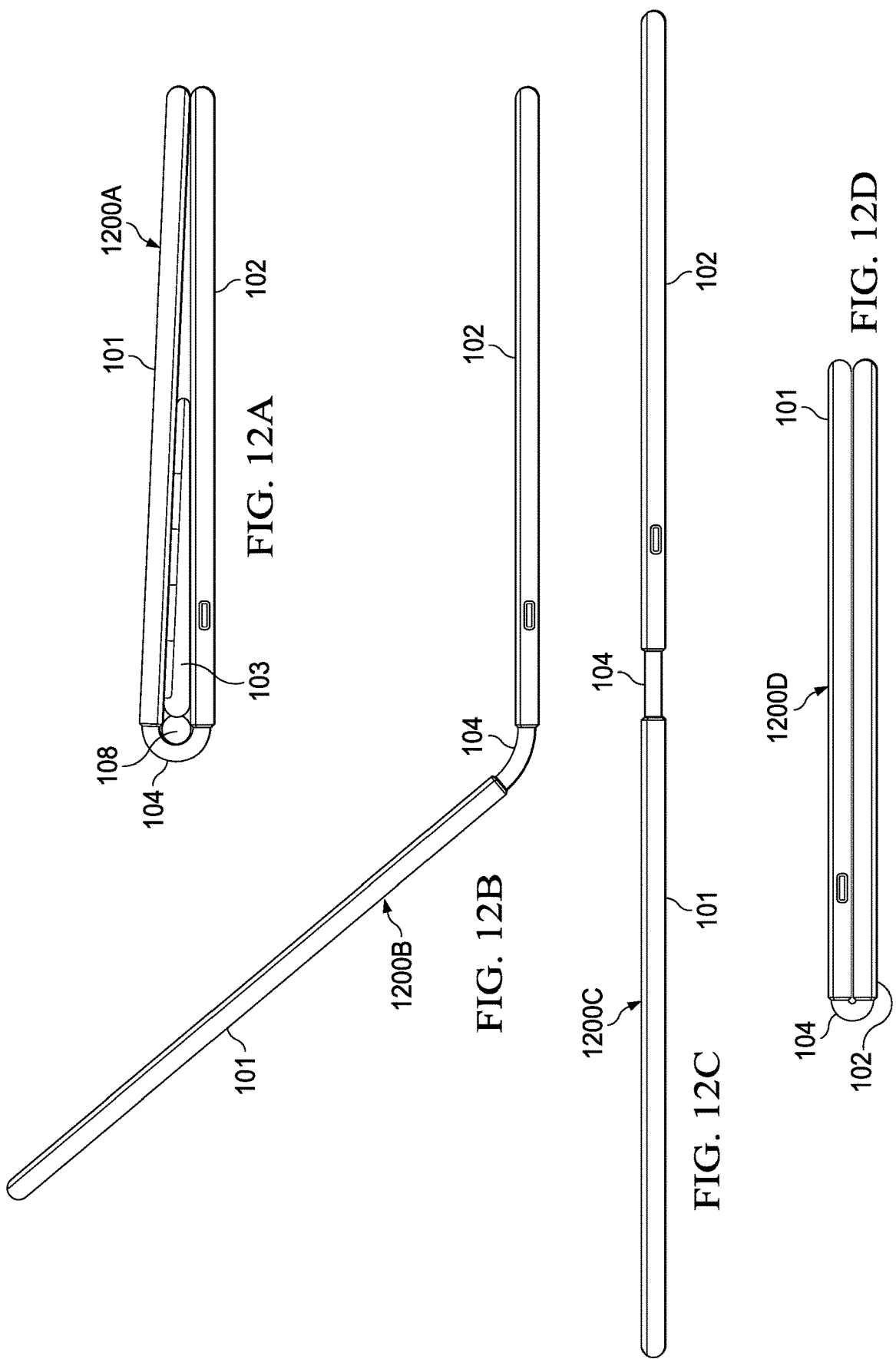

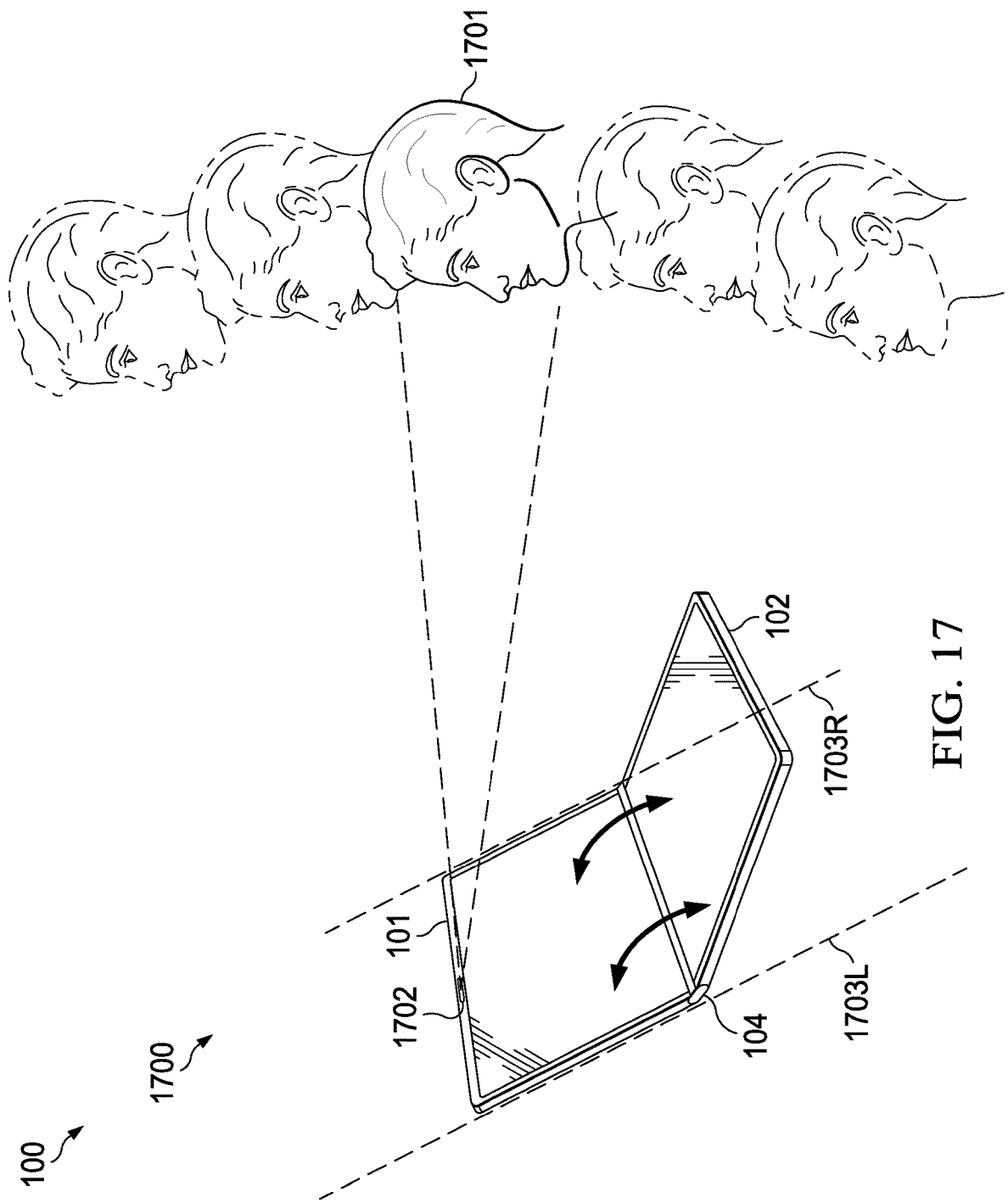

HINGE ACTIONS AND VIRTUAL EXTENDED DISPLAY MODES FOR MULTI-FORM FACTOR INFORMATION HANDLING SYSTEM (IHS)

FIELD

This disclosure relates generally to Information Handling Systems (IHSs), and more specifically, to systems and methods for enabling hinge actions and virtual extended display modes for multi-form factor IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Nowadays, users can choose among many different types of mobile IHS devices. Each type of device (e.g., tablets, 2-in-1s, mobile workstations, notebooks, netbooks, ultra-books, etc.) has unique portability, performance, and usability features; however, each also has its own trade-offs and limitations. For example, tablets have less compute power than notebooks and workstations, while notebooks and workstations lack the portability of tablets. A conventional 2-in-1 device combines the portability of a tablet with the performance of a notebook, but with a small display—an uncomfortable form factor in many use-cases.

The inventors hereof have determined that, as productivity continues to be a core tenet of modern computing, mobile IHS devices should provide versatility for many use-cases and display postures in use today (e.g., tablet mode, laptop mode, etc.), as well as future display postures (e.g., digital notebooks, new work surfaces, etc.). Additionally, mobile IHS devices should provide larger display area with reduced size and weight.

SUMMARY

Embodiments of systems and methods for enabling hinge actions and virtual extended display modes for multi-form factor Information Handling Systems (IHSs) are described. In an illustrative, non-limiting embodiment, an IHS may include: a processor; and a memory coupled to the processor, the memory having program instructions stored thereon that, upon execution by the processor, cause the IHS to: detect a change in an angle of a hinge coupling a first display to a second display; and in response to the detection, provide a Graphical User Interface (GUI) feature.

The detection may indicate an opening of the first display relative to the second display, and providing the GUI feature may include dynamically increasing a size of a rendered image in coordination with the opening. Providing the GUI feature may also include dynamically unfolding a plurality of pages of an electronic document rendered across the first and second displays in coordination with the opening. Alternatively, the detection may indicate a closing of the first display relative to the second display and providing the GUI feature may include dynamically reducing a size of a rendered image of an application in coordination with the closing. Providing the GUI feature may include dynamically folding a plurality of pages of an electronic document rendered across the first and second displays in coordination with the closing.

The program instructions, upon execution by the processor, may cause the IHS to determine that the second display moves by a greater distance than the first display during the change in the angle of the hinge, such that providing the GUI feature may include flipping a page of an electronic document rendered across the first and second displays in a forward direction. Additionally, or alternatively, the program instructions, upon execution by the processor, may cause the IHS to determine that the first display moves by a greater distance than the second display during the change in the angle of the hinge, and providing the GUI feature may include flipping a page of an electronic document rendered across the first and second displays in a backward direction.

The program instructions, upon execution by the processor, may cause the IHS to determine that the first display moves approximately the same as the second display during the change in the angle of the hinge, and providing the GUI feature may include maximizing an application window across the first and second displays. The program instructions, upon execution by the processor, may cause the IHS to detect a touch event on the second display during the change in the angle of the hinge, such that providing the GUI feature may include moving content from the second display to the first display.

In some cases, the program instructions, upon execution by the processor, may cause the IHS to detect a head position of a user operating the IHS in laptop posture, and providing the GUI feature may include applying a perspective correction to content rendered on the second display based upon the head position. For example, applying the perspective correction may include rendering content on a trapezoidal area of the second display that appears, to the user, to be at a straight angle with respect to a display surface of the first display.

The program instructions, upon execution by the processor, may also cause the IHS to apply a fading gradient to a portion of the trapezoidal area farthest from the hinge. The program instructions, upon execution by the processor, may further cause the IHS to apply a parallax adjustment to the second display. The program instructions, upon execution by the processor, may cause the IHS to detect a gaze point of the user, and to calculate the parallax adjustment based, at least in part, upon the gaze point.

In another illustrative, non-limiting embodiment, a method may include: detecting a change in an angle of a hinge coupling a first display to a second display of an IHS; and in response to the detection, providing a GUI feature. The change may indicate opening or closing of the first display relative to the second display, and providing the GUI feature may include dynamically unfolding or folding a plurality of pages of an electronic document rendered across the first and second displays in synchronization with the opening or closing, respectively. The method may also include determining that the second display moves by a greater or lesser distance than the first display during the change in the angle of the hinge, such that providing the GUI feature comprises flipping a page of an electronic document in a forward or backward direction, respectively.

In yet another illustrative, non-limiting embodiment, a hardware memory device may have program instructions stored thereon that, upon execution by a processor of an IHS, cause the IHS to: detect an angle of a hinge coupling a first display to a second display when the IHS is in a laptop posture; detect a head position of the user; and apply a perspective correction to content rendered on the second display based, at least in part, upon on the head position.

Applying the perspective correction further comprises rendering content on a trapezoidal area of the second display that appears, to the user, to be at a straight angle with respect to a display surface of the first display, and applying a fading gradient to a portion of the trapezoidal area farthest from the hinge. The program instructions, upon execution by the processor, may also cause the IHS to apply a parallax adjustment to touch inputs received via the second display.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIGS. 10A-C and 11A-C illustrate various use-cases, according to some embodiments.

FIGS. 12A-D illustrate a 360-hinge implementation, according to some embodiments.

FIG. 17 illustrates a headtracking system, according to some embodiments.

DETAILED DESCRIPTION

Embodiments described herein provide systems and methods for enabling hinge actions and virtual extended display modes for multi-form factor Information Handling Systems (IHSs). In various implementations, a mobile IHS device may include a dual-display, foldable IHS. Each display may include, for example, a Liquid Crystal Display (LCD), Organic Light-Emitting Diode (OLED), or Active Matrix OLED (AMOLED) panel or film, equipped with a touchscreen configured to receive touch inputs. The dual-display, foldable IHS may be configured by a user in any of a number of display postures, including, but not limited to: laptop, tablet, book, clipboard, stand, tent, and/or display.

A user may operate the dual-display, foldable IHS in various modes using a virtual, On-Screen Keyboard (OSK), or a removable, physical keyboard. In some use cases, a physical keyboard may be placed atop at least one of the screens to enable use of the IHS as a laptop, with additional User Interface (UI) features (e.g., virtual keys, touch input areas, etc.) made available via the underlying display, around the keyboard. In other use cases, the physical keyboard may be placed in front of the IHS to expose a larger display area. The user may also rotate the dual-display, foldable IHS, to further enable different modalities with the use of the physical keyboard. In some cases, when not in use, the physical keyboard may be placed or stored inside the dual-display, foldable IHS.

Figure 1:
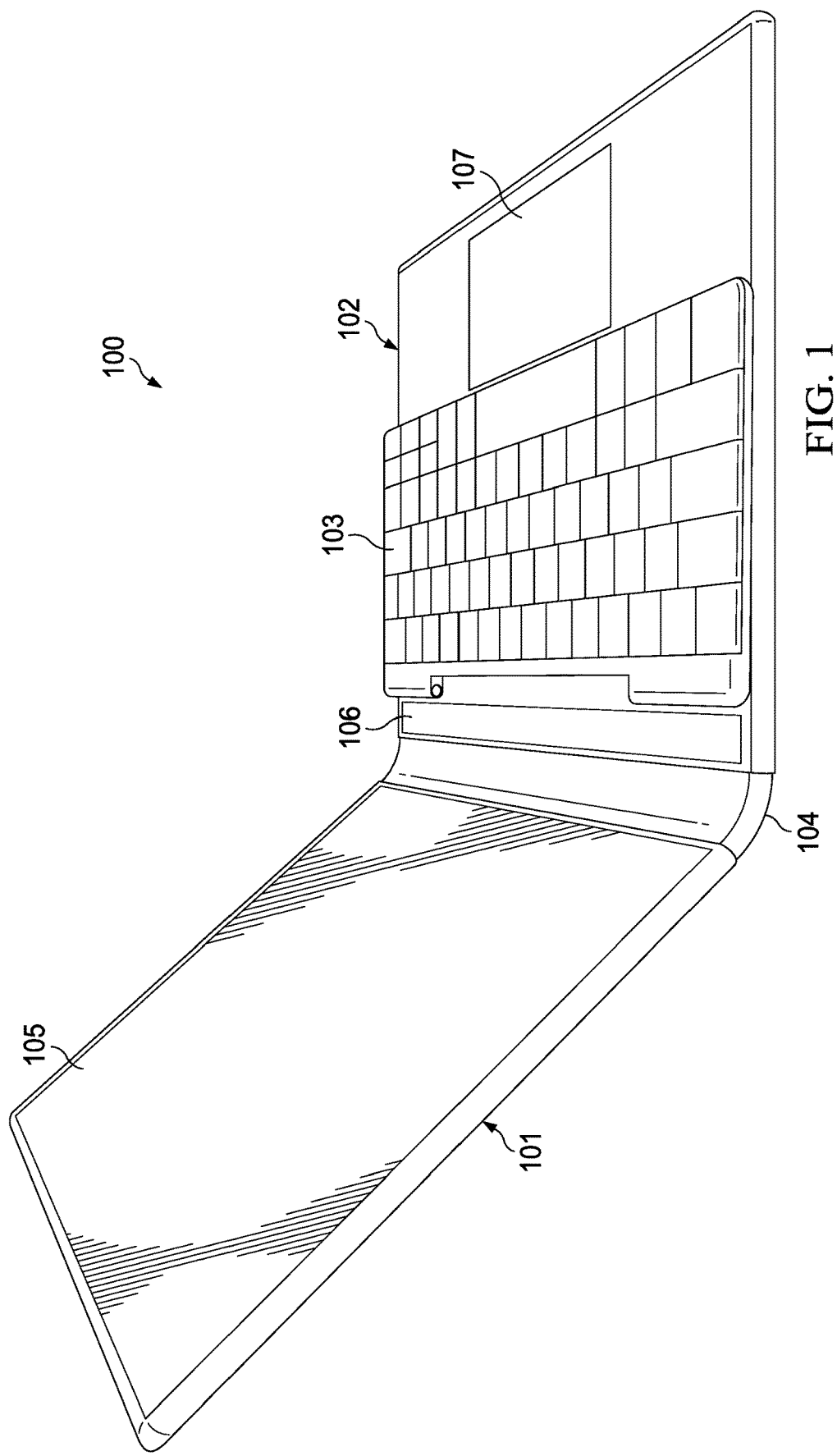
FIG. 1 is a perspective view of a multi-form factor Information Handling System (IHS) with a removable keyboard, according to some embodiments.

FIG. 1 is a perspective view of multi-form factor Information Handling System (IHS) 100 with removable keyboard 103. As shown, first display 101 is coupled to second display 102 via hinge 104, and keyboard 103 sits atop second display 102. The current physical arrangement of first display 101 and second display 102 creates a laptop posture, such that first display 101 becomes primary display area 105 presented by IHS 100, where video or display frames may be rendered for viewing by a user.

According to various embodiments, each of displays 101 and 102 may implement a display surface and an integrated touch screen digitizer. Examples of touchscreens or digitizers include, but are not limited to, a resistive touch surface, a surface acoustic wave touch surface, a capacitive touch surface, an infrared detection touch surface, etc. Moreover, touch instruments operable with displays 101 and 102 may include one or more fingers, a stylus or pen 108, a manually controlled pointing device, a totem (e.g., a DELL totem), etc.

In operation, in this particular laptop posture, second display 102 may sit horizontally on a work surface with its display surface facing up, and keyboard 103 may be positioned on top of second display 102, occluding a part of its display surface. In response to this posture and keyboard position, IHS 100 may dynamically produce a first UI feature in the form of at least one configurable secondary display area 106 (a "ribbon area" or "touch bar"), and/or a second UI feature in the form of at least one configurable touch input area 107 (a "virtual trackpad"), using the touchscreen of second display 102.

To identify a current posture of IHS 100 and a current physical relationship or spacial arrangement (e.g., distance, position, speed, etc.) between display(s) 101/102 and keyboard 103, IHS 100 may be configured to use one or more sensors disposed in first display 101, second display 102, keyboard 103, and/or hinge 104. Based upon readings from these various sensors, IHS 100 may then select, configure, modify, and/or provide (e.g., content, size, position, etc.) one or more UI features.

In various embodiments, displays 101 and 102 may be coupled to each other via hinge 104 to thereby assume a plurality of different postures, including, but not limited, to: laptop, tablet, book, or display.

When display 102 is disposed horizontally in laptop posture, keyboard 103 may be placed on top of display 102, thus resulting in a first set of UI features (e.g., ribbon area or touch bar 106, and/or touchpad 107). Otherwise, with IHS 100 still in the laptop posture, keyboard 103 may be placed next to display 102, resulting in a second set of UI features.

As used herein, the term "ribbon area" or "touch bar" 106 refers to a dynamic horizontal or vertical strip of selectable and/or scrollable items, which may be dynamically selected for display and/or IHS control depending upon a present context, use-case, or application. For example, when IHS 100 is executing a web browser, ribbon area or touch bar 106 may show navigation controls and favorite websites. Then, when IHS 100 operates a mail application, ribbon area or touch bar 106 may display mail actions, such as replying or flagging. In some cases, at least a portion of ribbon area or touch bar 106 may be provided in the form of a stationary control strip, providing access to system features such as brightness and volume. Additionally, or alternatively, ribbon area or touch bar 106 may enable multitouch, to support two or more simultaneous inputs.

In some cases, ribbon area 106 may change position, location, or size if keyboard 103 is moved alongside a lateral or short edge of second display 102 (e.g., from horizontally displayed alongside a long side of keyboard 103 to being vertically displayed alongside a short side of keyboard 103). Also, the entire display surface of display 102 may show rendered video frames if keyboard 103 is moved alongside the bottom or long edge of display 102. Conversely, if keyboard 103 is removed of turned off, yet another set of UI features, such as an OSK, may be provided via display(s) 101/102. As such, in many embodiments, the distance and/or relative position between keyboard 103 and display(s) 101/102 may be used to control various aspects the UI.

During operation, the user may open, close, flip, swivel, or rotate either of displays 101 and/or 102, via hinge 104, to produce different postures. In each posture, a different arrangement between IHS 100 and keyboard 103 results in different UI features being presented or made available to the user. For example, when second display 102 is folded against display 101 so that the two displays have their backs against each other, IHS 100 may be said to have assumed a canvas posture (e.g., FIGS. 7A-F), a tablet posture (e.g., FIG. 7G-J), a book posture (e.g., FIG. 8D), a stand posture (e.g., FIGS. 9A and 9B), or a tent posture (e.g., FIGS. 9C and 9D), depending upon whether IHS 100 is stationary, moving, horizontal, resting at a different angle, and/or its orientation (landscape vs. portrait).

In many of these scenarios, placement of keyboard 103 upon or near display(s) 101/102, and subsequent movement or removal, may result in a different set of UI features than when IHS 100 is in laptop posture.

In many implementations, different types of hinges 104 may be used to achieve and maintain different display postures, and to support different keyboard arrangements. Examples of suitable hinges 104 include, but are not limited to, the 360-hinge shown in FIGS. 12A-D). Hinge 104 may include wells or compartments for docking, cradling, charging, or storing accessories. Moreover, one or more aspects of hinge 104 may be monitored via one or more sensors (e.g., to determine whether an accessory is charging) when controlling the different UI features.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 2:
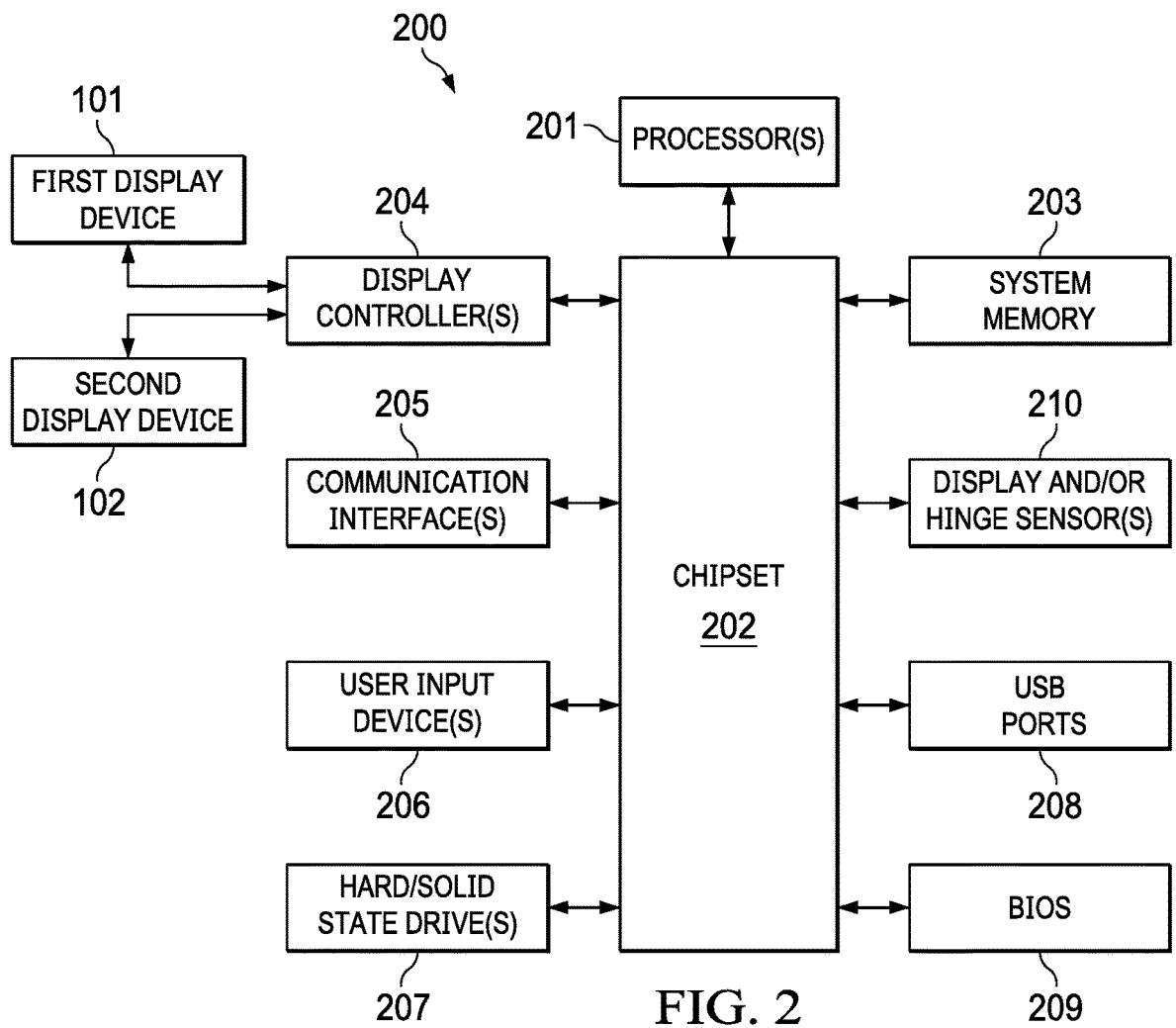
FIGS. 2 and 3 are block diagrams of components of the multi-form factor IHS and removable keyboard, respectively, according to some embodiments.

FIG. 2 is a block diagram of components 200 of multi-form factor IHS 100. As depicted, components 200 include processor 201. In various embodiments, IHS 100 may be a single-processor system, or a multi-processor system including two or more processors. Processor 201 may include any processor capable of executing program instructions, such as a PENTIUM series processor, or any general-purpose or embedded processors implementing any of a variety of Instruction Set Architectures (ISAs), such as an x86 ISA or a Reduced Instruction Set Computer (RISC) ISA (e.g., POWERPC, ARM, SPARC, MIPS, etc.).

IHS 100 includes chipset 202 coupled to processor 201. In certain embodiments, chipset 202 may utilize a QuickPath Interconnect (QPI) bus to communicate with processor 201. In various embodiments, chipset 202 may provide processor 201 with access to a number of resources. Moreover, chipset 202 may be coupled to communication interface(s) 205 to enable communications via various wired and/or wireless networks, such as Ethernet, WiFi, BLUETOOTH, cellular or mobile networks (e.g., CDMA, TDMA, LTE, etc.), satellite networks, or the like. For example, communication interface(s) 205 may be coupled to chipset 202 via a PCIe bus.

Chipset 202 may be coupled to display controller(s) 204, which may include one or more or graphics processor(s) (GPUs) on a graphics bus, such as an Accelerated Graphics Port (AGP) or Peripheral Component Interconnect Express (PCIe) bus. As shown, display controller(s) 204 provide video or display signals to first display device 101 and second display device 202. In other implementations, any number of display controller(s) 204 and/or display devices 101/102 may be used.

Each of display devices 101 and 102 may include a flexible display that is deformable (e.g., bent, folded, rolled, or stretched) by an external force applied thereto. For example, display devices 101 and 102 may include LCD, OLED, or AMOLED, plasma, electrophoretic, or electrowetting panel(s) or film(s). Each display device 101 and 102 may include a plurality of pixels arranged in a matrix, configured to display visual information, such as text, two-dimensional images, video, three-dimensional images, etc.

Display device(s) 101/102 may be configured to sense haptic and/or physical touch events, and to generate touch information. To this end, display device(s) 101/102 may include a touchscreen matrix (e.g., a layered capacitive panel or the like) and/or touch controller configured to receive and interpret multi-touch gestures from a user touching the screen with a stylus or one or more fingers. In some cases, display and touch control aspects of display device(s) 101/102 may be collectively operated and controlled by display controller(s) 204.

In some cases, display device(s) 101/102 may also comprise a deformation or bending sensor configured to generate deformation or bending information including, but not limited to: the bending position of a display (e.g., in the form of a "bending line" connecting two or more positions at which bending is detected on the display), bending direction, bending angle, bending speed, etc. In these implementations, display device(s) 101/102 may be provided as a single continuous display, rather than two discrete displays.

Chipset 202 may also provide processor 201 and/or display controller(s) 204 with access to memory 203. In various embodiments, system memory 203 may be implemented using any suitable memory technology, such as static RAM (SRAM), dynamic RAM (DRAM) or magnetic disks, or any nonvolatile/Flash-type memory, such as a solid-state drive (SSD) or the like. Memory 203 may store program instructions that, upon execution by processor 201 and/or controller(s) 204, present a UI interface to a user of IHS 100.

Chipset 202 may further provide access to one or more hard disk and/or solid-state drives 207. In certain embodiments, chipset 202 may also provide access to one or more optical drives or other removable-media drives. In certain embodiments, chipset 202 may also provide access to one or more Universal Serial Bus (USB) ports 208.

Upon booting of IHS 100, processor(s) 201 may utilize Basic Input/Output System (BIOS) 209 instructions to initialize and test hardware components coupled to IHS 100 and to load an Operating System (OS) for use by IHS 100. BIOS 209 provides an abstraction layer that allows the OS to interface with certain hardware components that are utilized by IHS 100. Via the hardware abstraction layer provided by BIOS 209, software stored in memory 203 and executed by the processor(s) 201 of IHS 100 is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

Chipset 202 may also provide access to one or more user input devices 206, for example, using a super I/O controller or the like. For instance, chipset 202 may provide access to a keyboard (e.g., keyboard 103), mouse, trackpad, stylus, totem, or any other peripheral input device, including touchscreen displays 101 and 102. These input devices may interface with chipset 202 through wired connections (e.g., in the case of touch inputs received via display controller(s) 204) or wireless connections (e.g., via communication interfaces(s) 205). In some cases, chipset 202 may be used to interface with user input devices such as keypads, biometric scanning devices, and voice or optical recognition devices.

In certain embodiments, chipset 202 may also provide an interface for communications with one or more sensors 210. Sensors 210 may be disposed within displays 101/102 and/or hinge 104, and may include, but are not limited to: electric, magnetic, radio, optical, infrared, thermal, force, pressure, acoustic, ultrasonic, proximity, position, deformation, bending, direction, movement, velocity, gyroscope, rotation, and/or acceleration sensor(s). In some cases, each of disaplys 101/102 may include a corresponding 9-DOF (degrees of freedom) sensor 210, or the like.

Figure 3:
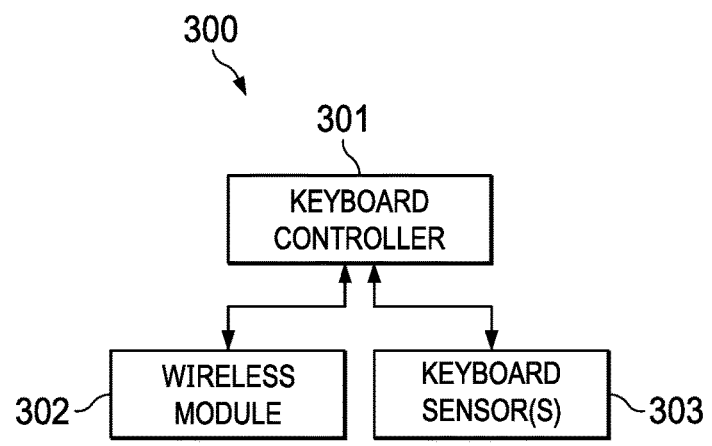

FIG. 3 is a block diagram of components 300 of keyboard 103. As depicted, components 300 include keyboard controller or processor 301, coupled to keyboard sensor(s) 303 and wireless communication module 302. In various embodiments, keyboard controller 301 may be configured to detect keystrokes made by user upon a keyboard matrix, and it may transmit those keystrokes to IHS 100 via wireless module 302 using a suitable protocol (e.g., BLUETOOTH). Keyboard sensors 303, which may also include any of the aforementioned types of sensor(s), may be disposed under keys and/or around the keyboard's enclosure, to provide information regarding the location, arrangement, or status of keyboard 103 to IHS 100 via wireless module 302. In other implementations, however, one or more keyboard sensors 303 (e.g., one or more Hall effect sensors, a magnetometer, etc.) may be disposed within first and/or second displays 101/102.

In some cases, a magnetic attachment and alignment system(s) may enable keyboard 103 to be attached to second display 102 (on the display surface, or on the back of display 102), and/or to be aligned on/off the surface of display 102, at predetermined locations. Moreover, display and/or hinge sensors 210 may be configured to determine which of a plurality of magnetic devices are presently engaged, so that the current position of keyboard 103 may be ascertained with respect to IHS 100. For example, keyboard 103 may have magnetic devices disposed along its short sides at selected locations. Moreover, second display 102 may include magnetic devices at locations that correspond to the keyboard's magnetic devices, and which snap keyboard 103 into any number of predetermined locations over the display surface of second display 102 alongside its short sides.

In various embodiments, systems and methods for on-screen keyboard detection may include a "fixed-position via Hall sensors" solution implemented as hardware/firmware that reads the multiple Hall sensors' information, calculates where a keyboard is detected, and sends the keyboard location (fixed positions) information to an OS. Additionally, or alternatively, these systems and methods may include a "variable-position via Hall sensors" solution implemented as hardware/firmware that reads a single Hall sensor's information based on the variable Gauss value of magnet(s) on keyboard 103.

Additionally, or alternatively, these systems and methods may include a "variable position via magnetometer" solution implemented as hardware/firmware that reads a single magnetometer's information based the relative location a single magnet on keyboard 103. Additionally, or alternatively, these systems and methods may include a "variable position via 3D Hall sensor" solution implemented as hardware/firmware that reads a 3D Hall sensor's information based the relative location a programmed magnet (different polarities) or array of magnets in different orientations on keyboard 103.

In some cases, by using magnetic keyboard detection, instead of relying upon touch sensors or the digitizer built into display 102, systems and methods described herein may be made less complex, using less power and fewer compute resources. Moreover, by employing a separate magnetic sensing system, IHS 100 may turn off touch in selected areas of display 102 such as, for example, in the areas of display 102 covered by keyboard 103.

In various embodiments, IHS 100 and/or keyboard 103 may not include all of components 200 and/or 300 shown in FIGS. 2 and 3, respectively. Additionally, or alternatively, IHS 100 and/or keyboard 103 may include components in addition to those shown in FIGS. 2 and 3, respectively. Additionally, or alternatively, components 200 and/or 300, represented as discrete in FIGS. 2 and 3, may be integrated with other components. For example, all or a portion of the functionality provided by components 200 and/or 300 may be provided as a System-On-Chip (SOC), or the like.

Figure 4:
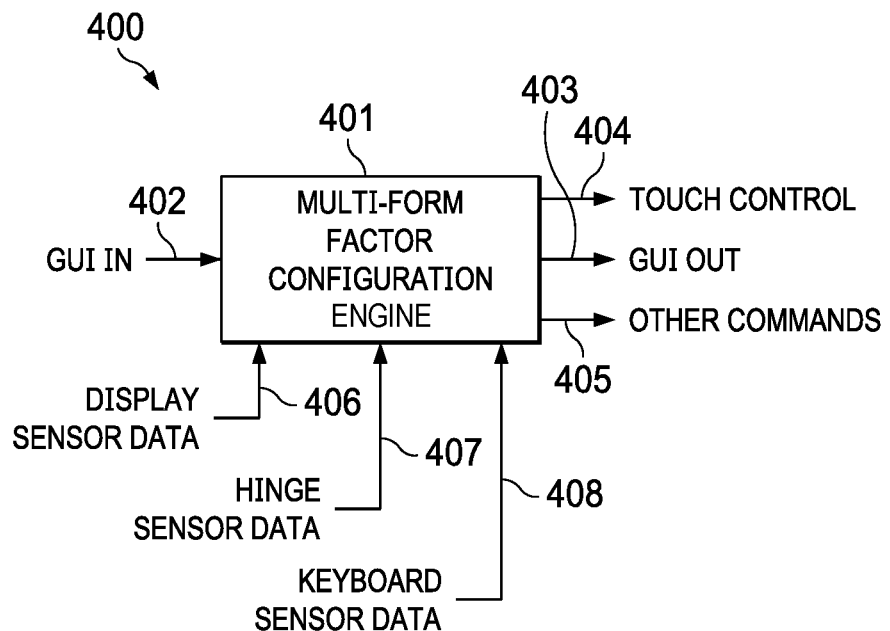
FIG. 4 is a block diagram of a multi-form factor configuration engine, according to some embodiments.

FIG. 4 is a block diagram of multi-form factor configuration engine 401. Particularly, multi-form factor configuration engine 401 may include electronic circuits and/or program instructions that, upon execution, cause IHS 100 to perform a number of operation(s) and/or method(s) described herein.

In various implementations, program instructions for executing multi-form factor configuration engine 401 may be stored in memory 203. For example, engine 401 may include one or more standalone software applications, drivers, libraries, or toolkits, accessible via an Application Programming Interface (API) or the like. Additionally, or alternatively, multi-form factor configuration engine 401 may be included the IHS's OS.

In other embodiments, however, multi-form factor configuration engine 401 may be implemented in firmware and/or executed by a co-processor or dedicated controller, such as a Baseband Management Controller (BMC), or the like.

As illustrated, multi-form factor configuration engine 401 receives Graphical User Interface (GUI) input or feature 402, and produces GUI output or feature 403, in response to receiving and processing one or more or: display sensor data 406, hinge sensor data 407, and/or keyboard sensor data 408. Additionally, or alternatively, multi-form factor configuration engine 401 may produce touch control feature 404 and/or other commands 405.

In various embodiments, GUI input 402 may include one or more images to be rendered on display(s) 101/102, and/or one or more entire or partial video frames. Conversely, GUI output 403 may include one or more modified images (e.g., different size, color, position on the display, etc.) to be rendered on display(s) 101/102, and/or one or more modified entire or partial video frames.

For instance, in response to detecting, via display and/or hinge sensors 406/407, that IHS 100 has assumed a laptop posture from a closed or "off" posture, GUI OUT 403 may allow a full-screen desktop image, received as GUI IN 402, to be displayed first display 101 while second display 102 remains turned off or darkened. Upon receiving keyboard sensor data 408 indicating that keyboard 103 has been positioned over second display 102, GUI OUT 403 may produce a ribbon-type display or area 106 around the edge(s) of keyboard 103, for example, with interactive and/or touch selectable virtual keys, icons, menu options, pallets, etc. If keyboard sensor data 408 then indicates that keyboard 103 has been turned off, for example, GUI OUT 403 may produce an OSK on second display 102.

Additionally, or alternatively, touch control feature 404 may be produced to visually delineate touch input area 107 of second display 102, to enable its operation as a user input device, and to thereby provide an UI interface commensurate with a laptop posture. Touch control feature 404 may turn palm or touch rejection on or off in selected parts of display(s) 101/102. Also, GUI OUT 403 may include a visual outline displayed by second display 102 around touch input area 107, such that palm or touch rejection is applied outside of the outlined area, but the interior of area 107 operates as a virtual trackpad on second display 102.

Multi-form factor configuration engine 401 may also produce other commands 405 in response to changes in display posture and/or keyboard state or arrangement, such as commands to turn displays 101/102 on or off, enter a selected power mode, charge or monitor a status of an accessory device (e.g., docked in hinge 104), etc.

Figure 5:
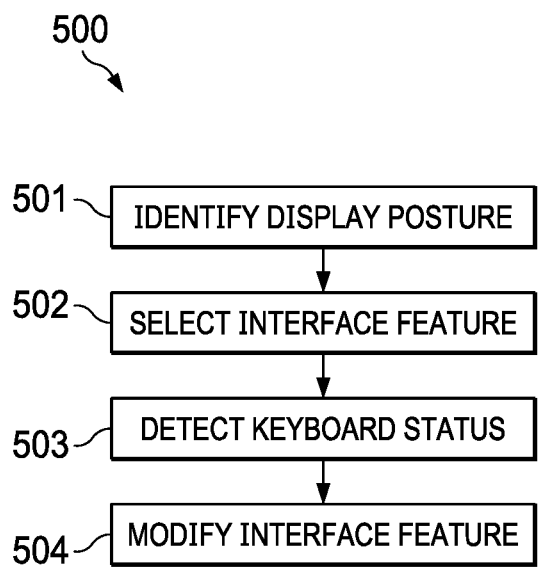
FIG. 5 is a flowchart of a method for configuring multi-form factor IHSs, according to some embodiments.

FIG. 5 is a flowchart of method 500 for configuring multi-form factor IHSs. In various embodiments, method 500 may be performed by multi-form factor configuration engine 401 under execution of processor 201. At block 501, method 500 includes identifying a display posture—that is, a relative physical arrangement between first display 101 and second display 102. For example, block 501 may use sensor data received from displays 101/102 and/or hinge 104 to distinguish among the various postures shown below.

At block 502, method 500 selects a UI feature corresponding to the identified posture. Examples of UI features include, but are not limited to: turning a display on or off; displaying a full or partial screen GUI; displaying a ribbon area; providing a virtual trackpad area; altering touch control or palm rejection settings; adjusting the brightness and contrast of a display; selecting a mode, volume, and/or or directionality of audio reproduction; etc.

At block 503, method 500 may detect the status of keyboard 103. For example, block 503 may determine that keyboard 103 is on or off, resting between two closed displays, horizontally sitting atop display(s) 101/102, or next to display(s) 101/102. Additionally, or alternatively, block 503 may determine the location or position of keyboard 103 relative to display 102, for example, using Cartesian coordinates. Additionally, or alternatively, block 503 may determine an angle between keyboard 103 and displays 101/102 (e.g., a straight angle if display 102 is horizontal, or a right angle if display 102 is vertical).

Then, at block 504, method 500 may modify the UI feature in response to the status of keyboard 103. For instance, block 504 may cause a display to turn on or off, it may change the size or position of a full or partial screen GUI or a ribbon area, it may change the size or location of a trackpad area with changes to control or palm rejection settings, etc. Additionally, or alternatively, block 504 may produce a new interface feature or remove an existing feature, associated with a display posture, in response to any aspect of the keyboard status meeting a selected threshold of falling within a defined range of values.

FIGS. 6A-C, 7A-J, 8A-D, and 9A-F illustrate examples of laptop, tablet, book, and display postures which may be detected by operation of block 501 of method 500 during execution of multi-form factor configuration engine 401 by IHS 100.

Figure 6A:
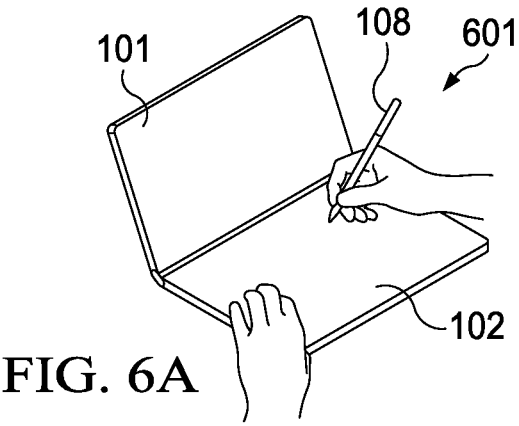
FIGS. 6A-C, 7A-J, 8A-D, and 9A-F illustrate examples of laptop, tablet, book, and display postures, respectively, according to some embodiments.
Figure 6B:
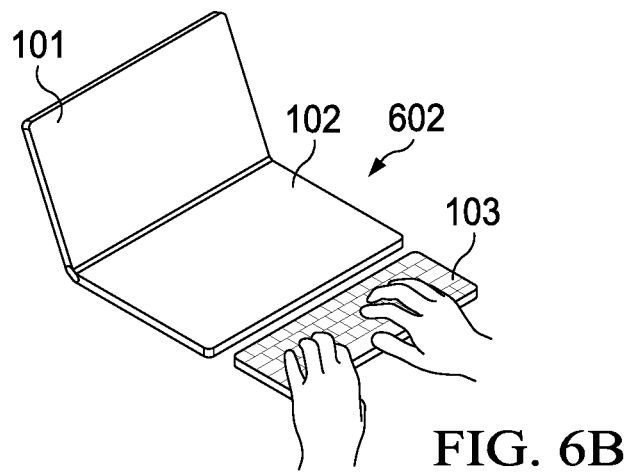
Figure 6C:
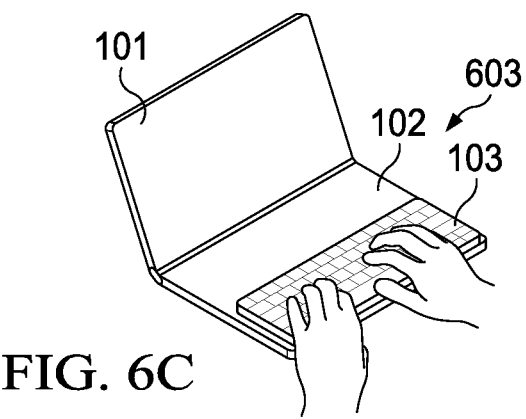

Particularly, FIGS. 6A-C show a laptop posture, where a first display surface of first display 101 is facing the user at an obtuse angle with respect to a second display surface of second display 102, and such that second display 102 is disposed in a horizontal position, with the second display surface facing up. In FIG. 6A, state 601 shows a user operating IHS 100 with a stylus or touch on second display 102. In FIG. 6B, state 602 shows IHS 100 with keyboard 103 positioned off the bottom edge or long side of second display 102, and in FIG. 6C, state 603 shows the user operating keyboard 103 atop second display 102.

Figure 7A:
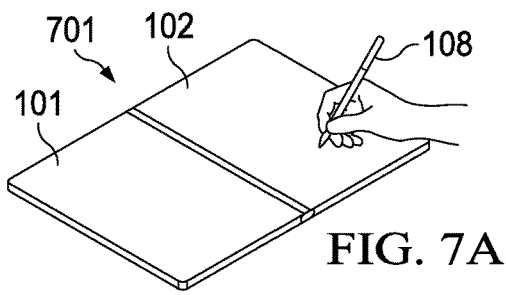
Figure 7B:
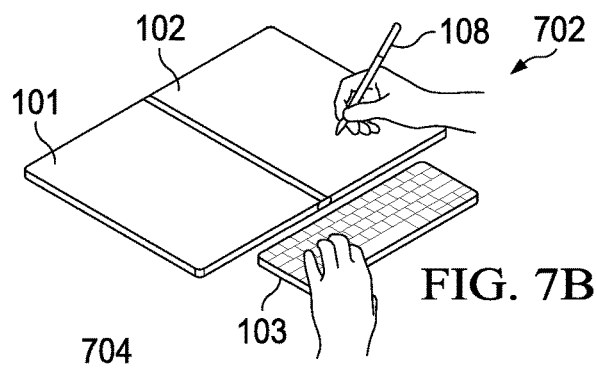
Figure 7C:
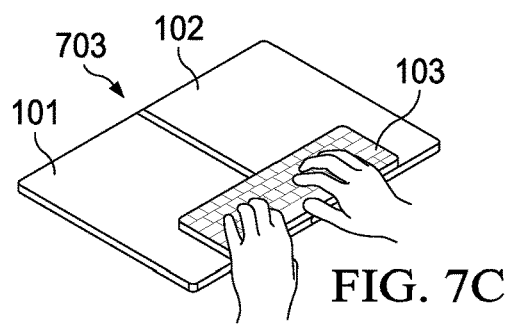
Figure 7D:
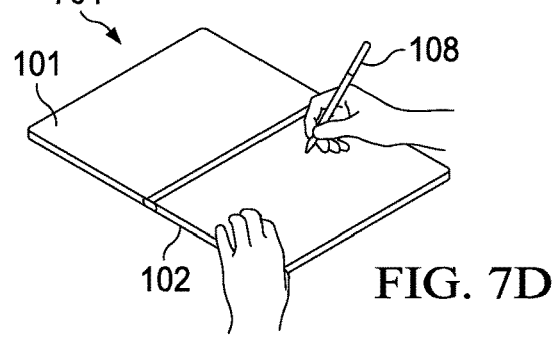
Figure 7E:
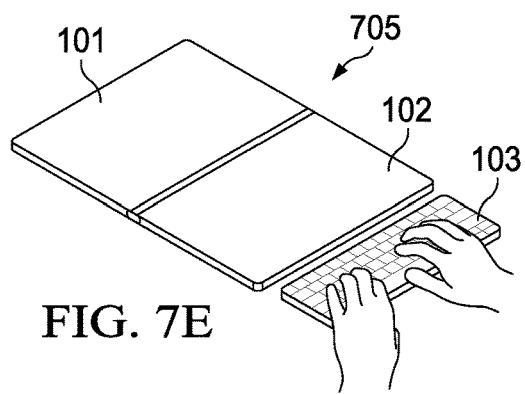
Figure 7F:
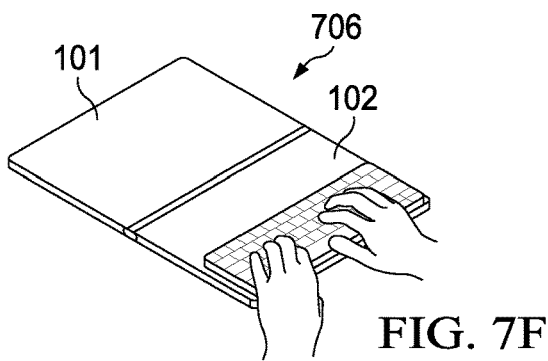

FIGS. 7A-J show a tablet posture, where first display 101 is at a straight angle with respect to second display 102, such that first and second displays 101 and 102 are disposed in a horizontal position, with the first and second display surfaces facing up. Specifically, FIG. 7A shows state 701 where IHS 100 is in a side-by-side, portrait orientation without keyboard 103, FIG. 7B shows state 702 where keyboard 103 is being used off the bottom edges or short sides of display(s) 101/102, and FIG. 7C shows state 703 where keyboard 103 is located over both displays 101 and 102. In FIG. 7D, state 704 shows IHS 100 in a side-by-side, landscape configuration without keyboard 103, in FIG. 7E state 705 shows keyboard 103 being used off the bottom edge or long side of second display 102, and in FIG. 7F state 706 shows keyboard 103 on top of second display 102.

Figure 7G:
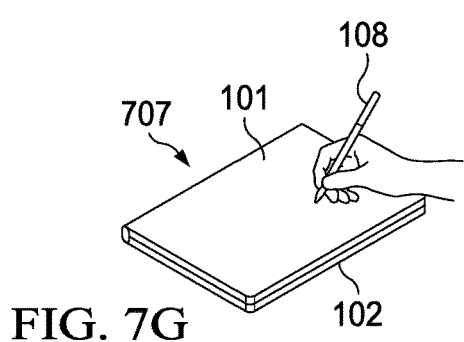
Figure 7H:
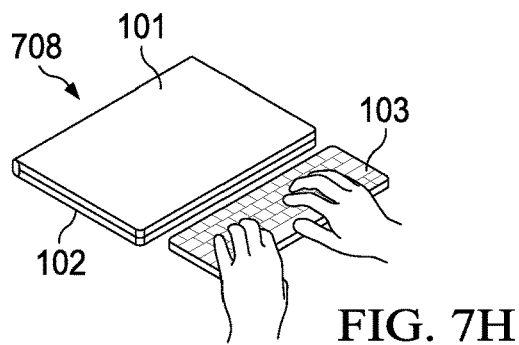
Figure 7I:
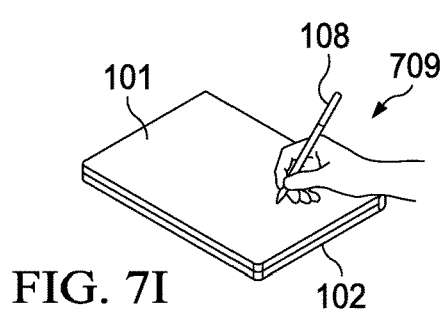
Figure 7J:
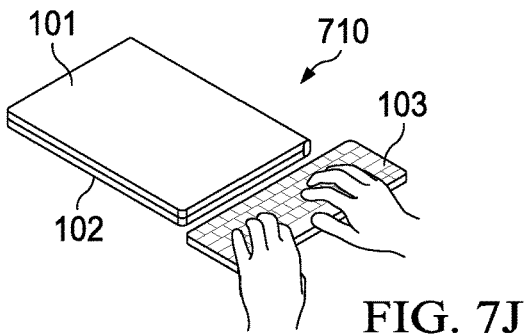

In FIG. 7G, state 707 shows first display 101 rotated around second display 102 via hinge 104 such that the display surface of second display 102 is horizontally facing down, and first display 101 rests back-to-back against second display 102, without keyboard 103; and in FIG. 7H, state 708 shows the same configuration, but with keyboard 103 placed off the bottom or long edge of display 102. In FIGS. 7I and 7J, states 709 and 710 correspond to states 707 and 708, respectively, but with IHS 100 in a portrait orientation.

Figure 8A:
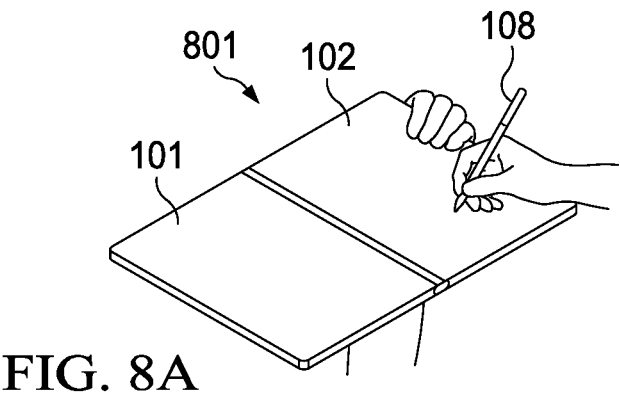
Figure 8B:
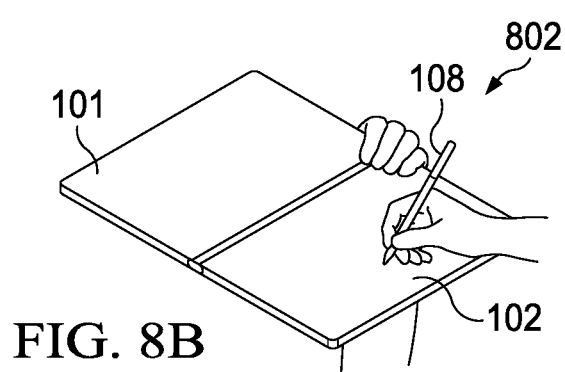
Figure 8C:
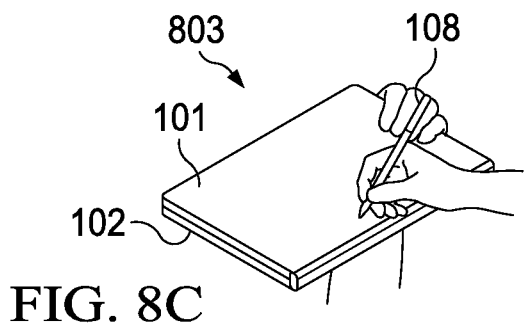
Figure 8D:
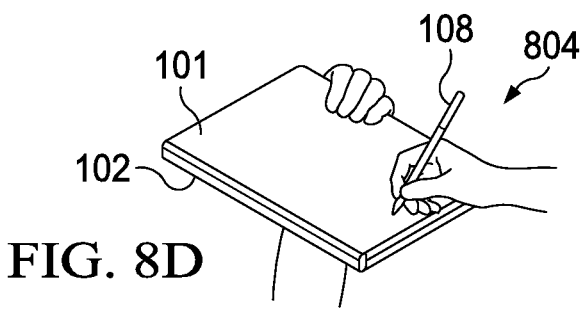
Figure 9A:
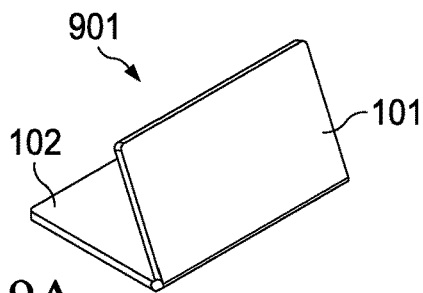
Figure 9B:
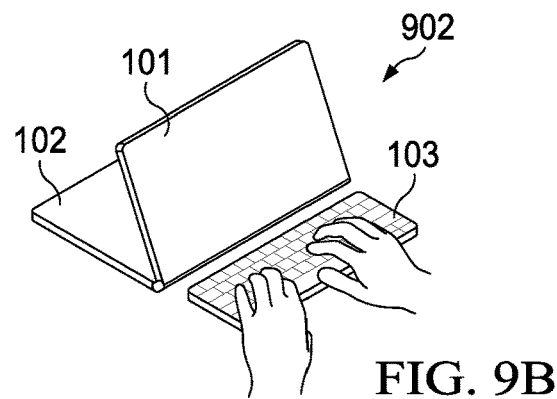

FIG. 8A-D show a book posture, similar to the tablet posture of FIGS. 7A-J, but such that neither one of displays 101 or 102 is horizontally held by the user and/or such that the angle between the display surfaces of the first and second displays 101 and 102 is other than a straight angle. In FIG. 8A, state 801 shows dual-screen use in portrait orientation, in FIG. 8B state 802 shows dual-screen use in landscape orientation, in FIG. 8C state 803 shows single-screen use in landscape orientation, and in FIG. 8D state 804 shows single-screen use in portrait orientation.

Figure 9C:
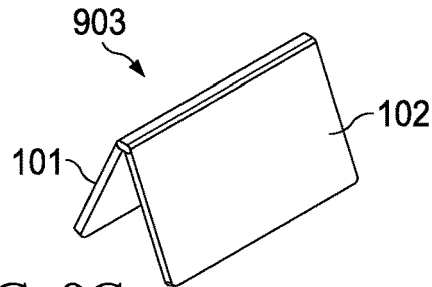
Figure 9D:
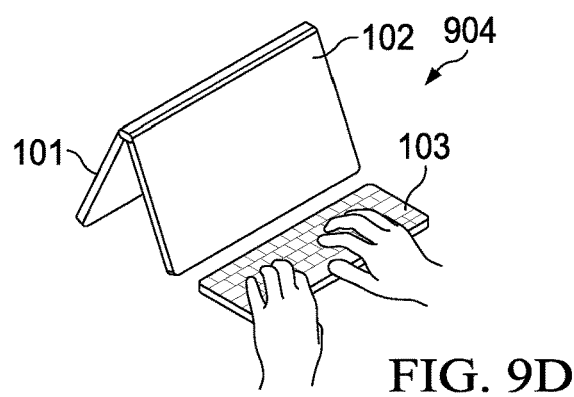
Figure 9E:
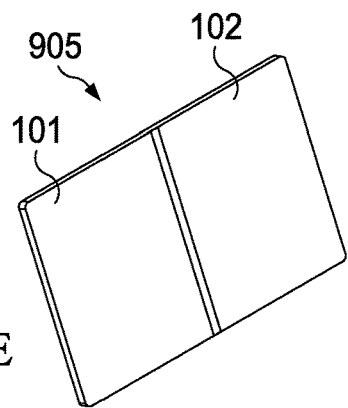
Figure 9F:
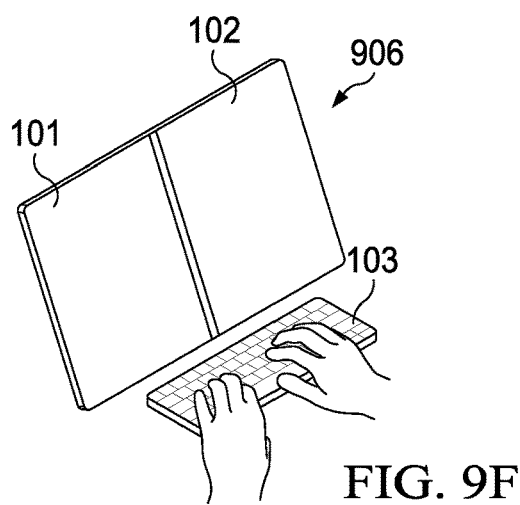
Figure 13A:
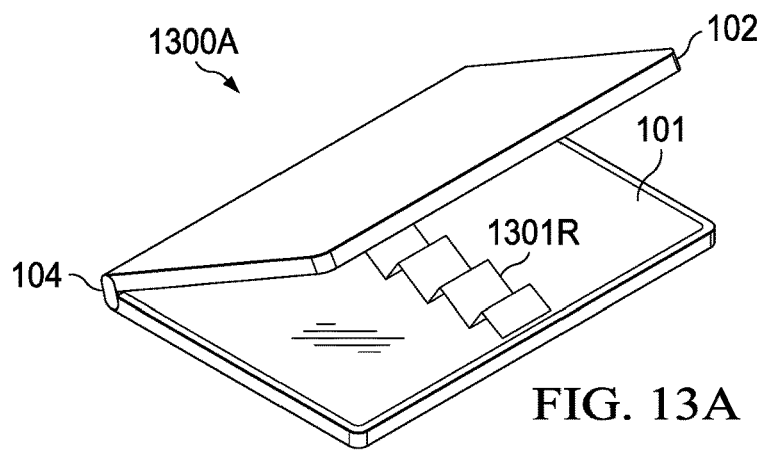
FIGS. 13A-E illustrate a notebook feature with responsive action(s) produced using hinge sensor data, according to some embodiments.
Figure 13B:
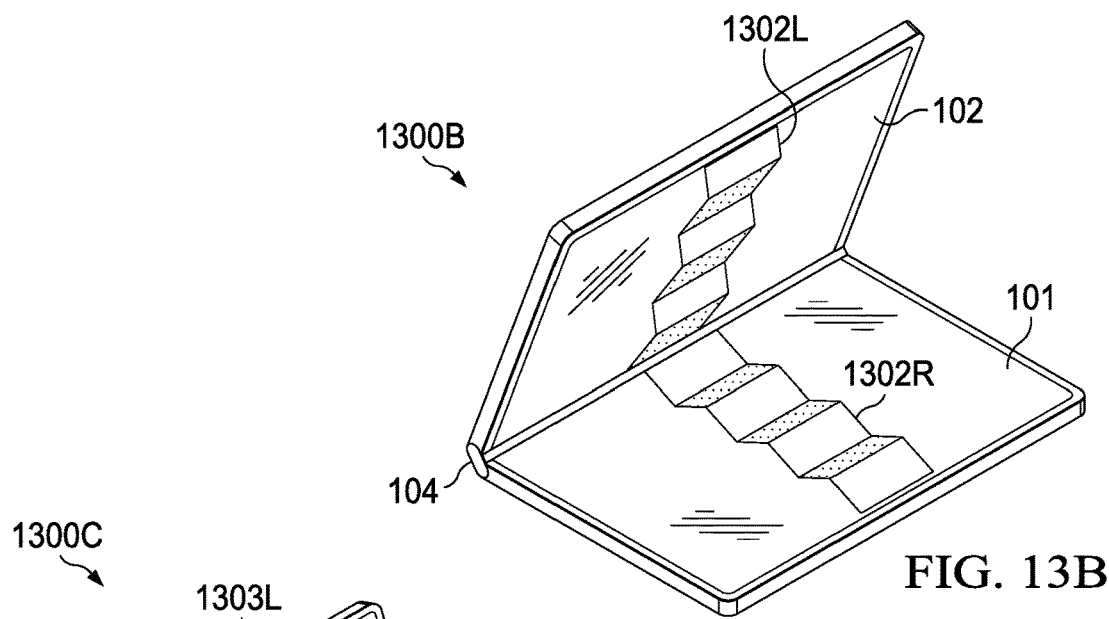
Figure 13C:
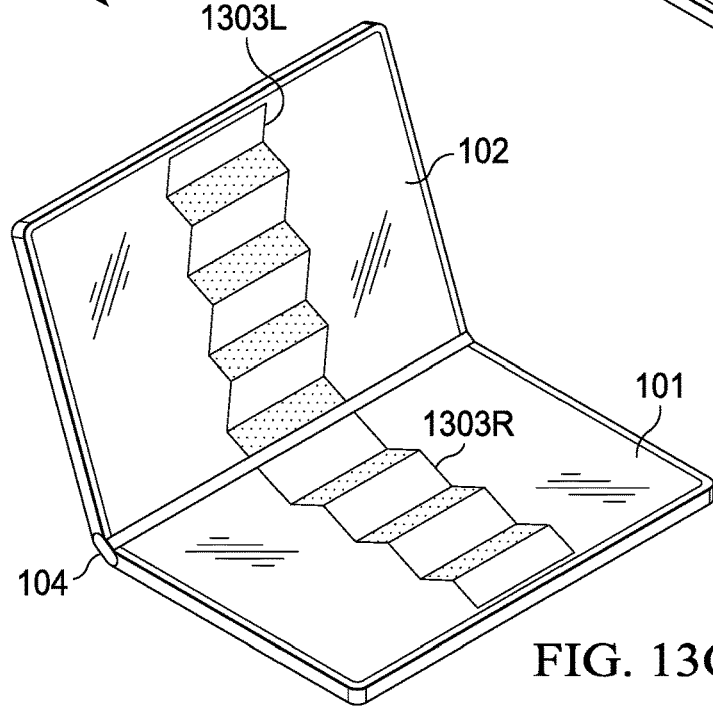
Figure 13D:
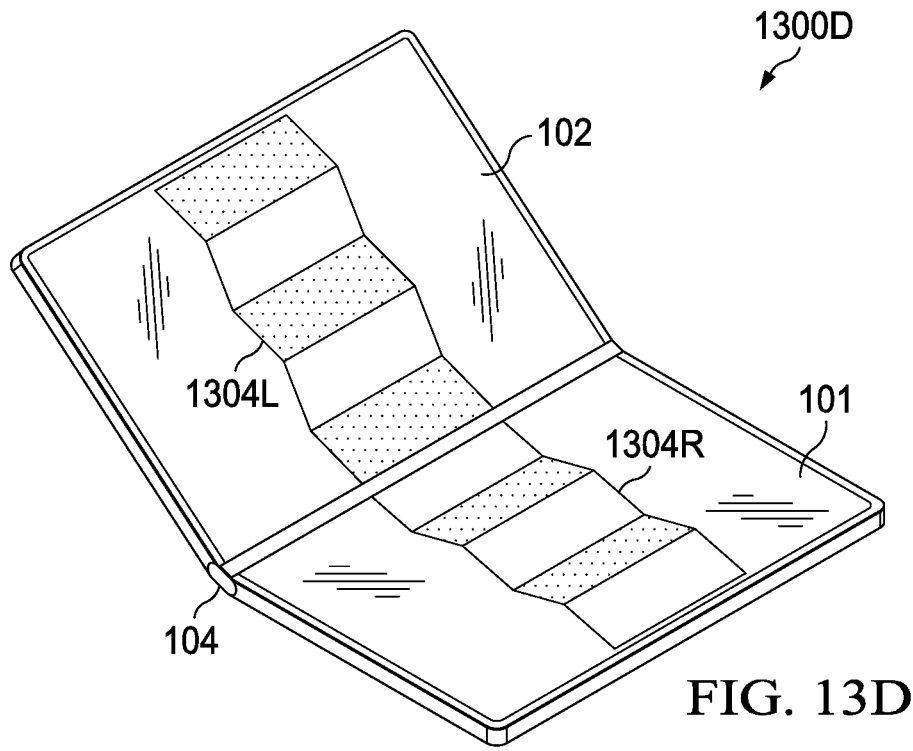
Figure 13E:
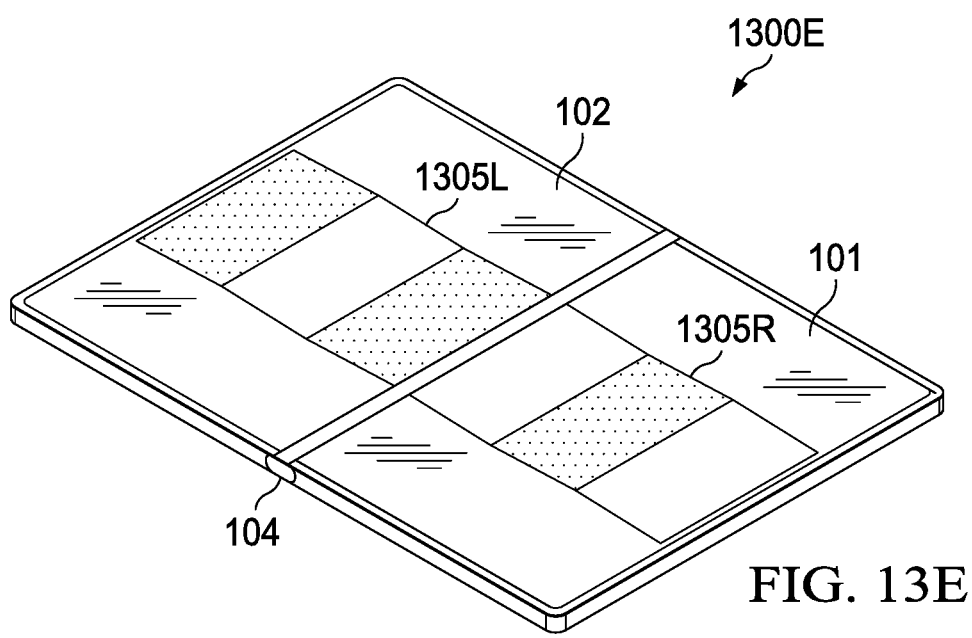

FIGS. 9A-F show a display posture, where first display 100 is at an acute angle with respect to second display 102, and/or where both displays are vertically arranged in a portrait orientation. Particularly, in FIG. 9A state 901 shows a first display surface of first display 102 facing the user and the second display surface of second display 102 horizontally facing down in a stand configuration ("stand"), whereas in FIG. 9B state 902 shows the same stand configuration but with keyboard 103 used off the bottom edge or long side of display 101. In FIG. 9C, state 903 shows a display posture where display 102 props up display 101 in a tent configuration ("tent"), and in FIG. 9D, state 904 shows the same tent configuration but with keyboard 103 used off the bottom edge or long side of display 101. In FIG. 9E, state 905 shows both displays 101 and 102 resting vertically or at display angle, and in FIG. 9F state 906 shows the same configuration but with keyboard 103 used off the bottom edge or long side of display 101.

It should be noted that the aforementioned postures, and their various respective keyboard states, are described for sake of illustration. In different embodiments, however, other postures and keyboard states may be used, for example, depending upon the type of hinge coupling the displays, the number of displays used, or other accessories. For instance, when IHS 100 is chargeable via a charging or docking station, the connector in the docking station may be configured to hold IHS 100 at angle selected to facility one of the foregoing postures (e.g., keyboard states 905 and 906).

FIGS. 10A-C illustrate a first example use-case of method 500 in the context of a laptop posture. In state 1000A of FIG. 10A, first display 101 shows primary display area 1001, keyboard 103 sits atop second display 102, and second display 102 provides UI features such as first ribbon area 1002 (positioned between the top long edge of keyboard 103 and hinge 104) and touch area 1003 (positioned below keyboard 103). As keyboard 103 moves up or down on the surface of display 102, ribbon area 1002 and/or touch area 1003 may dynamically move up or down, or become bigger or smaller, on second display 102. In some cases, when keyboard 103 is removed, a virtual OSK may be rendered (e.g., at that same location) on the display surface of display 102.

In state 1000B of FIG. 10B, in response to execution of method 500 by multi-form factor configuration engine 401, first display 101 continues to show main display area 1001, but keyboard 103 has been moved off of display 102. In response, second display 102 now shows secondary display area 1004 and also second ribbon area 1005. In some cases, second ribbon area 1005 may include the same UI features (e.g., icons, etc.) as also shown in area 1002, but here repositioned to a different location of display 102 nearest the long edge of keyboard 103. Alternatively, the content of second ribbon area 1005 may be different from the content of first ribbon area 1002.

In state 1000C of FIG. 10C, during execution of method 500 by multi-form factor configuration engine 401, IHS 100 detects that physical keyboard 103 has been removed (e.g., out of wireless range) or turned off (e.g., low battery), and in response display 102 produces a different secondary display area 1006 (e.g., smaller than 1004), as well as OSK 1007.

FIGS. 11A-C illustrate a second example use-case of method 500 in the context of a tablet posture. In state 1100A of FIG. 11A, second display 102 has its display surface facing up, and is disposed back-to-back with respect to second display 102, as in states 709/710, but with keyboard 103 sitting atop second display 102. In this state, display 102 provides UI features such primary display area 1101 and first ribbon area 1102, positioned as shown. As keyboard 103 is repositioned up or down on the surface of display 102, display area 1101, first ribbon area 1102, and/or touch area 1103 may also be moved up or down, or made bigger or smaller, by multi-form factor configuration engine 401.

In state 1100B of FIG. 11B, keyboard 103 is detected off of the surface of display 102. In response, first display 101 shows modified main display area 1103 and modified ribbon area 1104. In some cases, modified ribbon area 1104 may include the same UI features as area 1102, but here repositioned to a different location of display 102 nearest the long edge of keyboard 103. Alternatively, the content of second ribbon area 1104 may be different from the content of first ribbon area 1102. In some cases, the content and size of modified ribbon area 1104 may be selected in response to a distance between keyboard 103 and display 102.

In state 1100C of FIG. 11C, during continued execution of method 500, multi-form factor configuration engine 401 detects that physical keyboard 103 has been removed or turned off, and in response display 102 produces yet another display area 1105 (e.g., larger than 1003 or 1002), this time without an OSK.

In various embodiments, the different UI behaviors discussed in the aforementioned use-cases may be set, at least in part, by policy and/or profile, and stored in a preferences database for each user. In this manner, UI features and modifications of blocks 502 and 504, such as whether touch input area 1003 is produced in state 1000A (and/or its size and position on displays 101/102), or such as whether ribbon area 1102 is produced in state 1100A (and/or its size and position on displays 101/102), may be configurable by a user.

FIGS. 12A-D illustrate a 360-hinge implementation, usable as hinge 104 in IHS 100, in four different configurations 1200A-D, respectively. Particularly, 360-hinge 104 may include a plastic, acrylic, polyamide, polycarbonate, elastic, and/or rubber coupling, with one or more internal support, spring, and/or friction mechanisms that enable a user to rotate displays 101 and 102 relative to one another, around the axis of 360-hinge 104.

Hinge configuration 1200A of FIG. 12A may be referred to as a closed posture, where at least a portion of a first display surface of the first display 101 is disposed against at least a portion of a second display surface of the second display 102, such that the space between displays 101/102 accommodates keyboard 103. When display 101 is against display 102, stylus or accessory 108 may be slotted into keyboard 103. In some cases, stylus 108 may have a diameter larger than the height of keyboard 103, so that 360-hinge 104 wraps around a portion of the circumference of stylus 108 and therefore holds keyboard 103 in place between displays 101/102.

Hinge configuration 1200B of FIG. 12B shows a laptop posture between displays 101/102. In this case, 360-hinge 104 holds first display 101 up, at an obtuse angle with respect to first display 101. Meanwhile, hinge configuration 1200C of FIG. 12C shows a tablet, book, or display posture (depending upon the resting angle and/or movement of IHS 100), with 360-hinge 104 holding first and second displays 101/102 at a straight angle (180°) with respect to each other. And hinge configuration 1200D of FIG. 12D shows a tablet or book configuration, with 360-hinge 104 holding first and second displays 101 and 102 at a 360° angle, with their display surfaces in facing opposite directions.

In various embodiments, dual-screen foldables, such as IHS 100, have a multi-planar I/O surface in displays 101/102 and therefore present opportunities for new UI features and interactions based upon hinge sensor data 407 (e.g., current hinge angle, changes in hinge angle, speed of change, etc.) collected from hinge sensors 210. In various implementations, the different UI features discussed below may be provided by the operation of method 500, as performed by multi-form factor configuration engine 401, under execution of processor 201 of IHS 100.

For example, FIGS. 13A-E illustrate a notebook feature with responsive action(s) produced using hinge sensor data 407. As shown in views 1300A-E, a user opens display 101 relative to display 102 and gradually changes the hinge angle (in hinge sensor data 407) as follows: view 1300A shows a hinge angle of 30° with booklet portion 1301R on first display 101 (portion 1301L on second display 102 is not shown), view 1300B shows a hinge angle of 70° with booklet portion 1302R on first display 101 (portion 1302L on second display 102 is not shown), view 1300C shows a hinge angle of 110° with booklet portion 1303L on second display 102 and portion 1303R on first display 101, view 1300D shows a hinge angle of 140° with booklet portion 1304L on second display 102 and portion 1304R on first display 101, and view 1300E shows a hinge angle of 180° with booklet portion 1305L on second display 102 and portion 1305R on first display 101.

As the hinge angle changes, displays 101/102 render a spread booklet view of an electronic document (e.g., with two or more pages). In the opening direction 1300A→1300E, IHS 100 may dynamically increase a size of (e.g., it may magnify or zoom in) the rendered booklet in coordination with the opening. For example, IHS 100 may progressively unfold a plurality of pages of the document in coordination with the opening.

Conversely, when IHS 100 detects a closing of first display 101 relative to second display 102 in the closing direction 1300E→1300A, IHS 100 may dynamically reduce a size of the rendered booklet view in coordination with the closing. For instance, IHS 100 may progressively fold a plurality of pages of the document in coordination with the closing.

If IHS 100 is executing a notetaking or document processing application, for example, when opening a booklet (in dual-screen mode) IHS 100 may present the last activity the user was engaged in (on any synchronized device) within its context. As IHS 100 is opened, the notetaking application expands and opens in synchronization with the opening of the physical hinge 104.

Figure 14A:
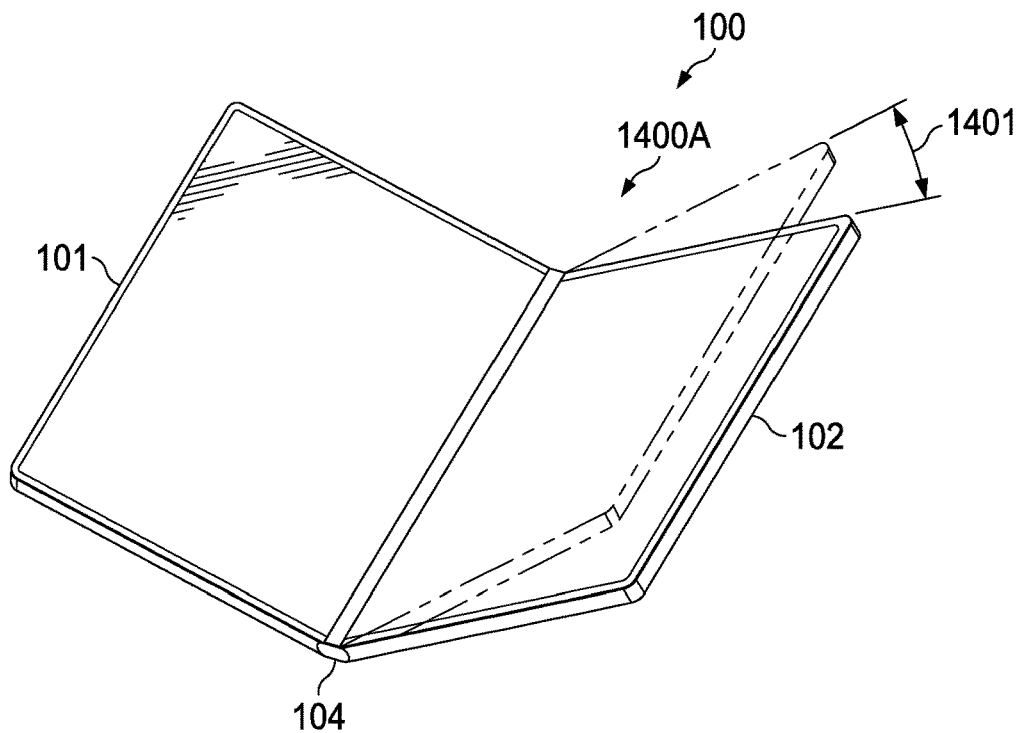
FIGS. 14A and 14B illustrate a page turning feature with responsive action(s) produced using hinge sensor data, according to some embodiments.
Figure 14B:
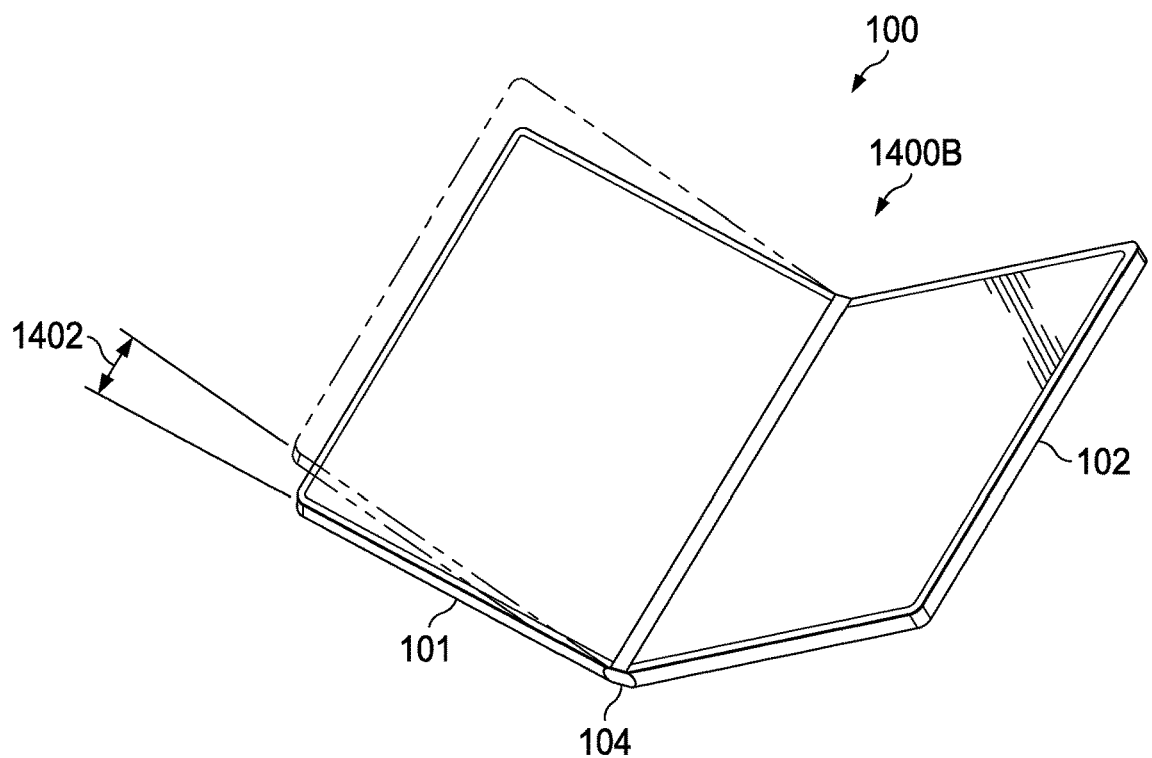

FIGS. 14A and 14B illustrate a page turning feature with responsive action(s) produced using hinge sensor data 407. In various implementations, a user may slightly bend in the "spine" (that is, hinge 104) to turn between pages of a document or other content. For example, consider an initial condition where first display 101 is displaying page 2, and second display 102 is displaying page 3, of the same electronic document (e.g, an "ebook"). In configuration 1400A, IHS 100 detects that a user has changed the hinge angle if display 102 is moved by amount 1401 (e.g., 20°), causing a page flipping or back-and-forth movement. In response to second display 102 moving by a greater distance than first display 101 (during the change in the angle of hinge 104), IHS 100 flips a page of the electronic document in a forward direction, such that display 101 now renders page 3, and display 102 renders new page 4.

Now starting from the same initial condition, but in configuration 1400B, IHS 100 detects that a user has changed the hinge angle when display 101 is moved by amount 1402 (e.g., −20°), causing a page flipping or back-and-forth movement. In response to first display 101 moving by a greater distance than second display 102 (during the change in the angle of hinge 104), IHS 100 flips a page of the electronic document in a backward direction, such that second display 102 now renders page 2, and first display 102 renders page 1.

Figure 15A:
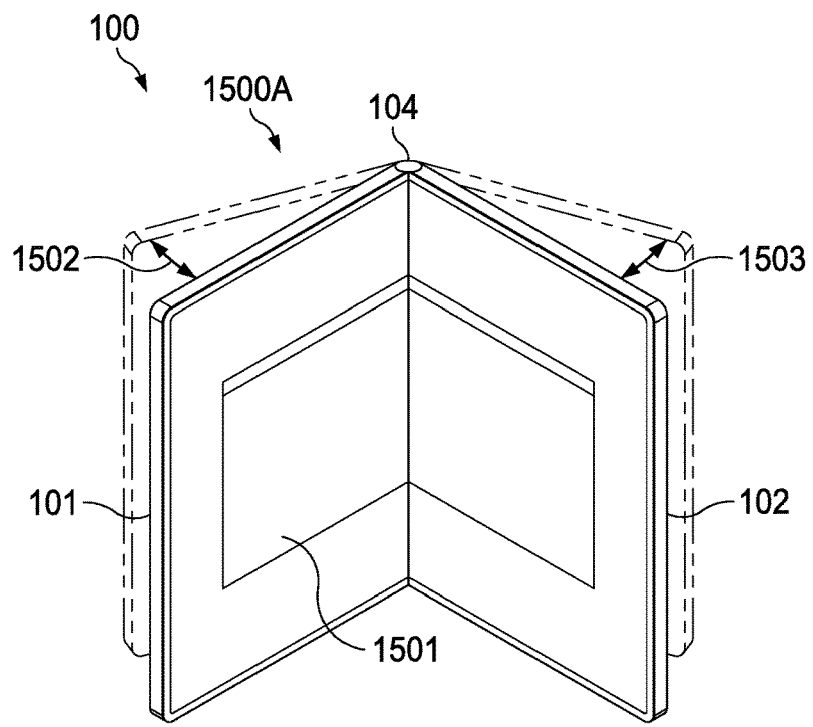
FIGS. 15A and 15B illustrate a content panning feature with responsive action(s) produced using hinge sensor data, according to some embodiments.
Figure 15B:
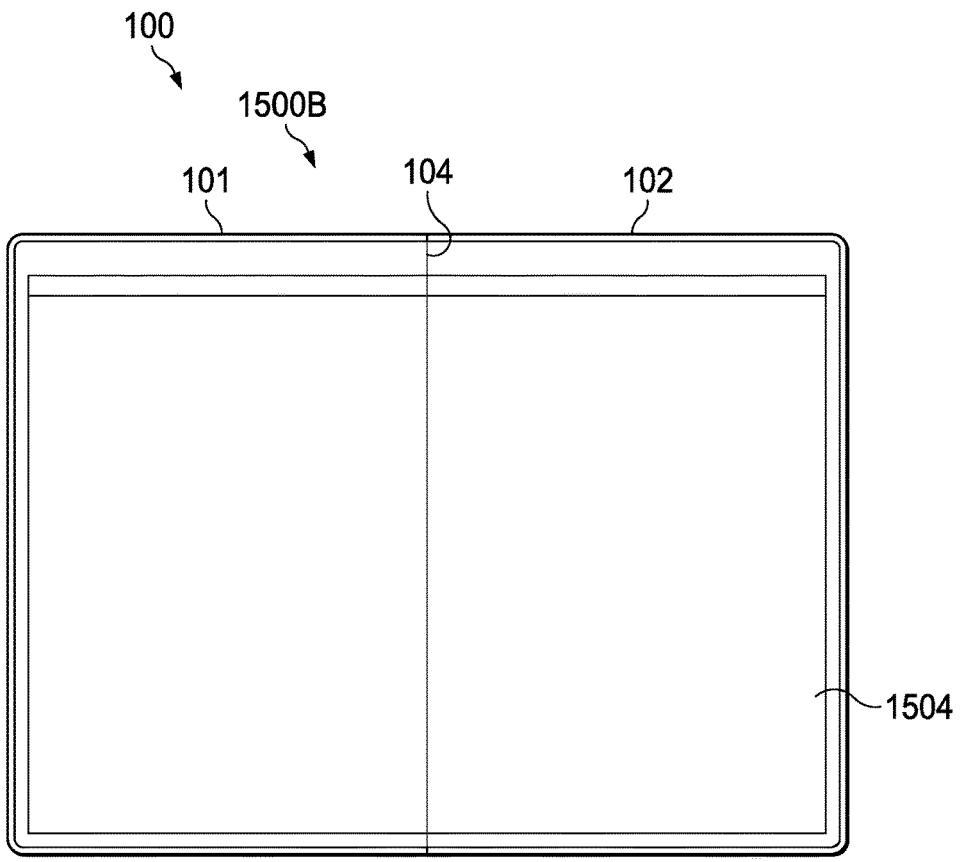

FIGS. 15A and 15B illustrate a content panning feature with responsive action(s) produced using hinge sensor data 407. In various implementations, a user may bend the spine (that is, hinge 104) to "zoom" a 2d space back into view (e.g., a mapping application). For example, in configuration 1500A, first display 101 and second display 102 are rendering content application window 1501, when the user moves first display by angle 1502 and second display by angle 1503, within a selected time interval, such that the hinge angle is originally obtuse, becomes straight, and is then returned obtuse again (of same or different magnitude).

In some cases, IHS 100 may determine that first display 101 moves by approximately the same amount as second display 102 (as the hinge angle changes). In response, as shown in configuration 1500B, IHS 100 may render maximized application window 1504, covering all or most of the display surfaces of displays 101/102.

Figure 16:
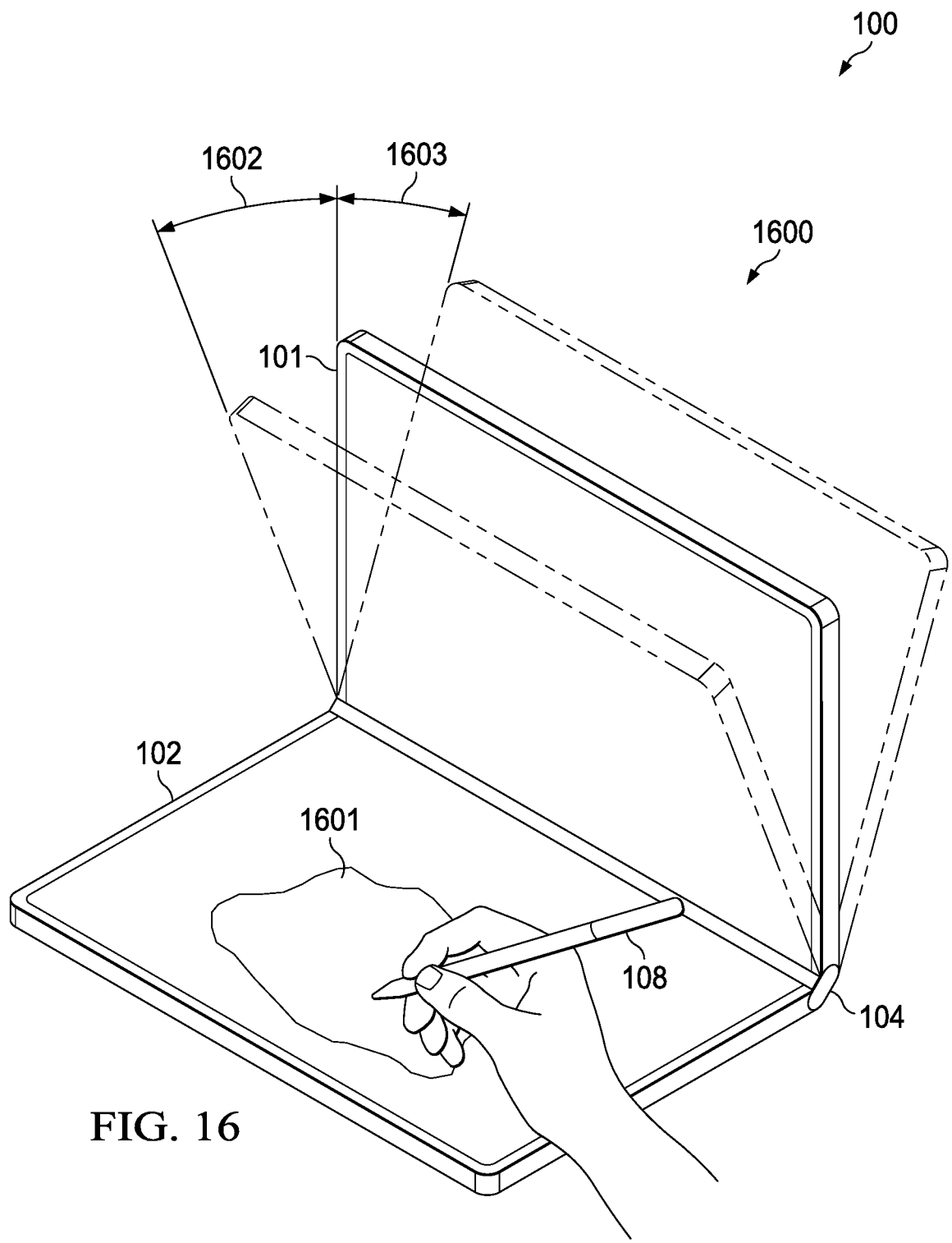
FIG. 16 illustrates a touch feature with responsive action(s) produced using hinge sensor data, according to some embodiments.

FIG. 16 illustrates a touch feature with responsive action(s) produced using hinge sensor data. In various implementations, a user may press-and-hold (e.g., with a finger, with stylus 108, etc.) a touch area of second display 102, for example, where content 1601 is rendered. Concurrently, the user may close hinge 104 in direction 1602 or open it in direction 1603, using first display 101.

In some cases, in response to the detection of the press-and-hold event along with the opening or increase of the angle of hinge 104, IHS 100 may move content 1601 from second display 102 to first display 101. Additionally, or alternatively, IHS 100 may maximize content 1601 (e.g., an application window) on display 101.

In other cases, in response to the detection of the press-and-hold event along with the closing or decrease of the angle of hinge 104, IHS 100 may dismiss content 1601 from second display 102 (e.g., close or minimize an application window). Additionally, or alternatively, IHS 100 may change access settings or privileges associated with content 1601 (e.g., make the content private, password-protected, move to trash or delete it, etc.).

In various applications, a headtracking system may be added to IHS 100 to enable additional operating modes, such as, for example, a virtual extended display mode. FIG. 17 illustrates headtracking system 1700. In some implementations, headtracking system 1700 may include a visual image camera as headtracking sensor 1702, configured to determine the spatial position of the head of user 1701 (e.g., in X-Y-Z coordinates). Based upon the user's head position and/or based upon the current angle of hinge 104, IHS 100 may calculate perspective lines 1703L and/or 1703R, with respect to the display surface of second display 102. As the user's head 1701 moves in space and/or as the angle of hinge 104 changes, perspective lines 1703L and/or 1703R are updated to provide a continuous line with respect to the edges of display 101, from the visual or physical perspective of user 1701.

In some cases, headtracking system 1700 may also include a projector/camera assembly mounted or built into display 101, as sensor 1702, which may be configured to create a pattern of infrared or (near-infrared) light on eyes of the user 1701. The projector/camera assembly may be configured to take high-frame-rate images of the user's eyes and their reflection patterns. Then, IHS 100 may be configured to find specific details in the user's eyes that enable it to calculate the eye's position and gaze point or focus. As such, IHS 100 may be configured to identify a specific window or other area of a screen, and/or a graphical entity being visually inspected by user 1701 in real-time.

Figure 18B:
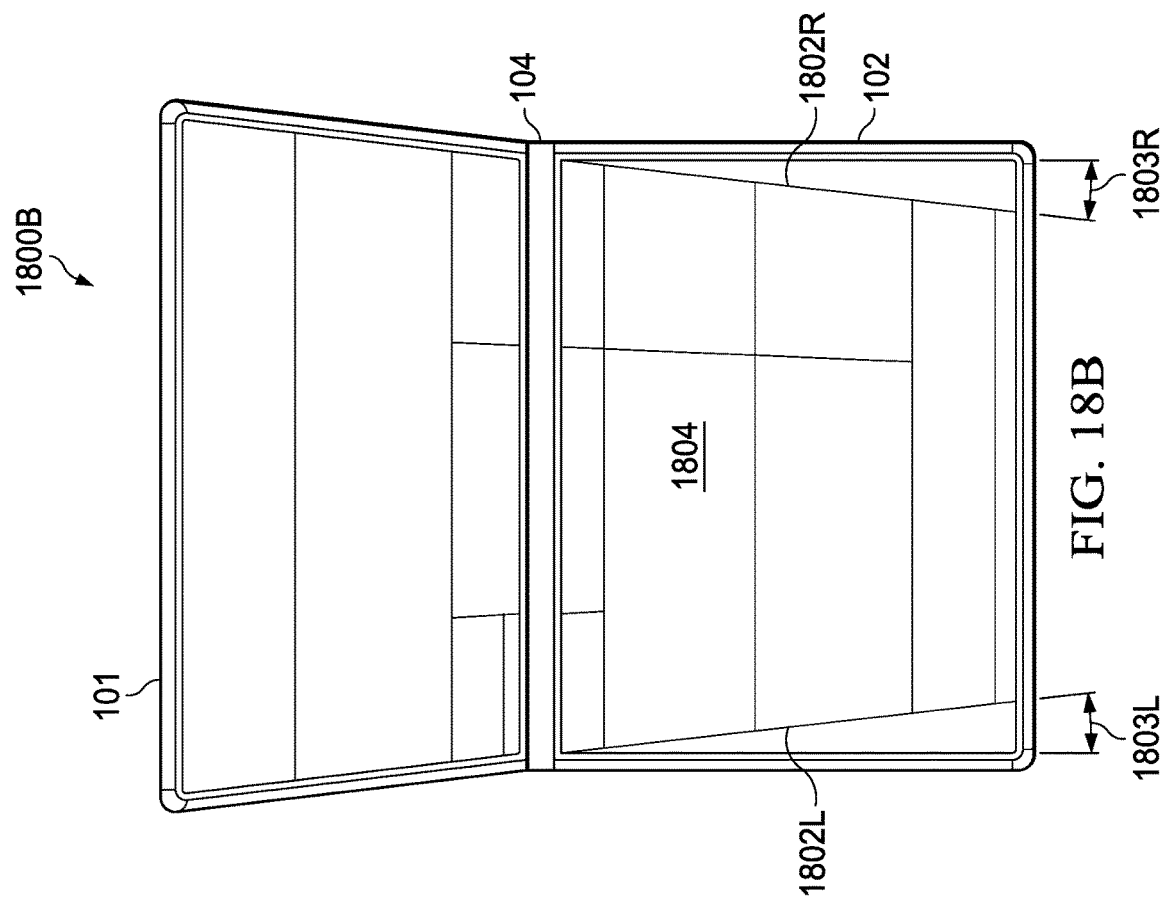
FIGS. 18A and 18B illustrate a perspective correction feature produced using a headtracking system, according to some embodiments.
Figure 18A:
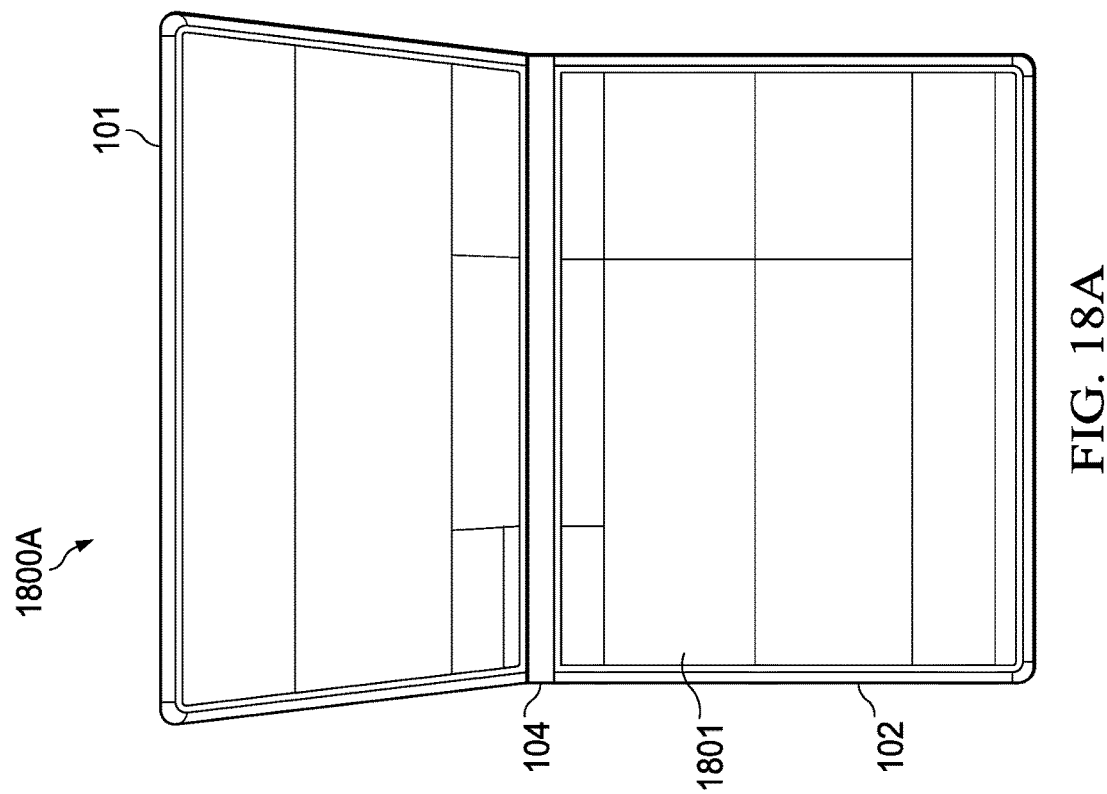

FIGS. 18A and 18B illustrate a perspective correction feature produced using head tracking system 1700. In various implementations, perspective correction may be provided by the operation of method 500, as performed by multi-form factor configuration engine 401, under execution of processor 201 of IHS 100, based upon: hinge sensor data 407, headtracking data (e.g., position, pose, etc.), and/or Eye-Gaze Tracking (EGT) data (e.g., gaze point or vector) received from headtracking system 1700.

Configuration 1800A shows IHS 100 with content 1801 rendered on display 102 but without perspective correction, for sake of comparison. In configuration 1800B, perspective correction has been applied. As such, content 1804 is now shown in a trapezoidal area with display boundaries set by lines 1802L and 1802R, at angles 1803L and 1803R, with respect to the edges of the display surface, respectively. In various embodiments, angles 1803L and 1803R may be calculated based upon the user's head position 1701 so that area 1804 appears, to the user, to be at a straight angle with respect to a display surface of first display 101.

In some cases, IHS 100 the aforementioned perspective correction may be augmented by a parallax adjustment. Particularly, in each of displays 101/102, a touchscreen or digitizer may be overlaid onto an LCD. As part of the manufacturing process of displays 101/102, a location on the touchscreen or digitizer layer within a display (e.g., a "contact location" in touchscreen coordinates) may be perpendicularly mapped to a corresponding location on the LCD layer of that same display (a "display location" in display coordinates).

In normal use, however, if a user is not perfectly perpendicularly aligned with the intended contact and display locations, a "parallax effect" associated with the user's viewing angle may result in errors, such as, for example, accidental touch input selections. Hence, IHS 100 often undergoes a calibration process, sometimes managed by the IHS's OS or configuration utility, whereby a set of visual targets is presented to a user, and the user touches stylus 108 (or a tip of their finger) to a contact location where the user perceives each target to be displayed.

Data is collected for each target location, and then used to estimate offsets, in the x axis and in the y axis, between the actual contact location (e.g., the portion of the touchscreen or digitizer that is actually touched by the tip of stylus 108 or the user's finger), or the location that actually senses any hovering, and an intended contact location (e.g., the portion of digitizer that corresponds, perpendicularly, to the display location of a visual target). These offset values, also referred to as parallax values, correspond to the difference between a contact location on the touch surface perpendicular to a displayed object and a perceived location on the touch surface corresponding to the displayed object.

In some cases, parallax values may be normalized or otherwise used to estimate other offsets for other touch points or visual targets at different locations from those presented during the calibration process. After calibration is completed, parallax values may be used to correct touch events—actual touch or hovering—in a manner that compensates for parallax effects (e.g., by subtracting an x-y offset from each touch event).

During operation of IHS 100, the user may transition or manipulate displays 101 and 102 into different postures (e.g., laptop, tablet, etc.) using hinge 104 and/or orientations. To maintain high-accuracy of the touch input interface in different postures, in response to a change in hinge angle, IHS 100 may correct one or more touch input setting(s) or parameter(s) in first display 101 and/or second display 102, such as one or more parallax values, specifically for its current posture and/or orientation.

In some embodiments, parallax value(s) may be calculated, at least in part, based upon a current posture and/or orientation of IHS 100. Additionally, or alternatively, parallax value(s) derived during an original calibration procedure may be adjusted or corrected to account for the current posture and/or orientation of IHS 100.

Corrected or newly calculated parallax values may be used to offset rendered objects on the LCD, such that objects are within the line of sight of the user in the present posture and/or orientation (which again may be different from the posture and/or orientation used during calibration). Additionally, or alternatively, by remapping contact locations on the touchscreen or digitizer to display locations on the LCD using corrected parallax value(s), touch inputs provided via stylus 108 may be offset and/or shifted to their intended contact locations.

In some implementations, adjusted or corrected parallax values may be calculated for every contact location. In other embodiments, one or more adjusted or corrected parallax values calculated for one or more contact locations may be used to derive parallax values for one or more other contact locations, for example, by mathematical interpolation or extrapolation.

One or more corrected parallax values may be calculated, derived, and/or retrieved based on current posture, orientation, and/or hinge angle of IHS 100. A service may be configured to read context information from an OS and applications, identify the posture that IHS 100 is currently in (for example, based on an angle of hinge 104), and manage touch input operations, for example, by re-calculating and/or normalizing calibration tables and/or values for the current posture, orientation, and/or hinge angle.

In some cases, parallax values may be calculated that take the hinge angle into account. In other cases, parallax values derived or stored for configuration may be adjusted, corrected, re-calculated, normalized, or retrieved using the hinge angle and/or the position/orientation changes of displays 101/102.

In some cases, IHS 100 may be configured to determine whether angle of hinge 104 has changed. In response, IHS 100 may normalize or re-calculate the touch input calibration or parallax values for each contact point on displays 101/102 using the hinge angle change (e.g., relative to the hinge angle used during calibration). Additionally, or alternatively, IHS 100 may retrieve new touch input calibration or parallax values to be applied to displays 101/102, for a detected hinge angle, from the LUT or database.

Figure 19:
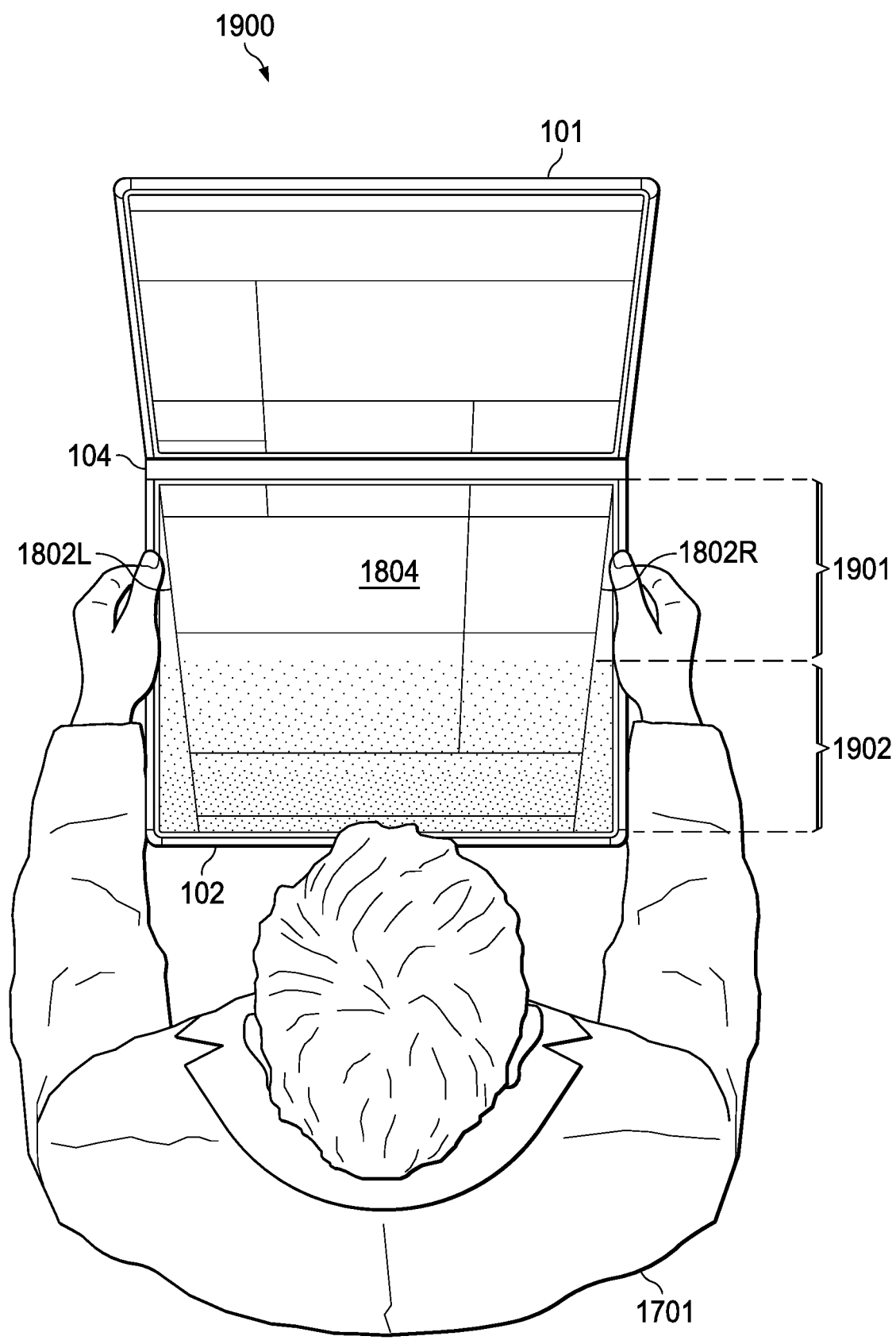
FIG. 19 illustrates a virtual extended display mode, according to some embodiments.

FIG. 19 illustrates virtual extended display mode 1900 of IHS 100. In various implementations, virtual extended display mode 1900 may be provided by the operation of method 500, as performed by multi-form factor configuration engine 401, under execution of processor 201 of IHS 100. For example, a virtual extended display mode 1900 may create an end-user optically aligned extended display surface for applications and content to "extend" down onto the lower display on a separate axis.

In some implementations, in addition providing to perspective correction, IHS 100 may be configured to apply a horizontally fading gradient 1902 to trapezoidal area 1804 of second display 102, while leaving top area 1901 (nearest hinge 104) intact. As such, it appears to user 1701 that second display 102 is "bottomless," and/or that the content rendered in display 101 virtually extends into second display 102 into infinity.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
    a processor; and
    a memory coupled to the processor, the memory having program instructions stored thereon that, upon execution by the processor, cause the IHS to:
        detect a change in an angle of a hinge coupling a first display to a second display;
        detect a head position of a user operating the IHS in laptop posture; and
        in response to the detections, provide a Graphical User Interface (GUI) feature, wherein providing the GUI feature comprises applying a perspective correction to content rendered on the second display based upon the head position, at least in part, by: (a) rendering content on a trapezoidal area of the second display that appears, to the user, to be at a straight angle with respect to a display surface of the first display, or (b) applying a parallax adjustment to the second display.

2. The IHS of claim 1, wherein the detection indicates an opening of the first display relative to the second display, and wherein providing the GUI feature comprises dynamically increasing a size of a rendered image in coordination with the opening.

3. The IHS of claim 2, wherein providing the GUI feature further comprises dynamically unfolding a plurality of pages of an electronic document rendered across the first and second displays in coordination with the opening.

4. The IHS of claim 1, wherein the detection indicates a closing of the first display relative to the second display, and wherein providing the GUI feature comprises dynamically reducing a size of a rendered image of an application in coordination with the closing.

5. The IHS of claim 4, and wherein providing the GUI feature further comprises dynamically folding a plurality of pages of an electronic document rendered across the first and second displays in coordination with the closing.

6. The IHS of claim 1, wherein the program instructions, upon execution by the processor, further cause the IHS to determine that the second display moves by a greater distance than the first display during the change in the angle of the hinge, and wherein providing the GUI feature comprises flipping a page of an electronic document rendered across the first and second displays in a forward direction.

7. The IHS of claim 1, wherein the program instructions, upon execution by the processor, further cause the IHS to determine that the first display moves by a greater distance than the second display during the change in the angle of the hinge, and wherein providing the GUI feature comprises flipping a page of an electronic document rendered across the first and second displays in a backward direction.

8. The IHS of claim 1, wherein the program instructions, upon execution by the processor, further cause the IHS to determine that the first display moves approximately the same as the second display during the change in the angle of the hinge, and wherein providing the GUI feature comprises maximizing an application window across the first and second displays.

9. The IHS of claim 1, wherein the program instructions, upon execution by the processor, further cause the IHS to detect a touch event on the second display during the change in the angle of the hinge, and wherein providing the GUI feature comprises moving content from the second display to the first display.

10. The IHS of claim 1, wherein the program instructions, upon execution by the processor, further cause the IHS to apply a fading gradient to a portion of the trapezoidal area farthest from the hinge.

11. The IHS of claim 1, wherein the program instructions, upon execution by the processor, further cause the IHS to detect a gaze point of the user, and to calculate the parallax adjustment based, at least in part, upon the gaze point.

12. A method, comprising:
 detecting a change in an angle of a hinge coupling a first display to a second display of an Information Handling System (IHS);
 detecting a head position of a user operating the IHS in laptop posture; and
 in response to the detections, providing a Graphical User Interface (GUI) feature, wherein providing the GUI feature comprises applying a perspective correction to content rendered on the second display based upon the head position, at least in part, by: (a) rendering content on a trapezoidal area of the second display that appears, to the user, to be at a straight angle with respect to a display surface of the first display, or (b) applying a parallax adjustment to the second display.

13. The method of claim 12, wherein the change indicates opening or closing of the first display relative to the second display, and wherein providing the GUI feature comprises dynamically unfolding or folding a plurality of pages of an electronic document rendered across the first and second displays in synchronization with the opening or closing, respectively.

14. The method 12, further comprising determining that the second display moves by a greater or lesser distance than the first display during the change in the angle of the hinge, and wherein providing the GUI feature comprises flipping a page of an electronic document in a forward or backward direction, respectively.

15. A hardware memory device having program instructions stored thereon that, upon execution by a processor of an Information Handling System (IHS), cause the IHS to:
 detect an angle of a hinge coupling a first display to a second display when the IHS is in a laptop posture;
 detect a head position of the user; and
 in response to the detections, provide a Graphical User Interface (GUI) feature, wherein providing the GUI feature comprises applying a perspective correction to content rendered on the second display based upon the head position, at least in part, by: (a) rendering content on a trapezoidal area of the second display that appears, to the user, to be at a straight angle with respect to a display surface of the first display, or (b) applying a parallax adjustment to the second display.

16. The hardware memory device of claim 15, wherein applying the perspective correction further comprises rendering content on a trapezoidal area of the second display that appears, to the user, to be at a straight angle with respect to a display surface of the first display, and applying a fading gradient to a portion of the trapezoidal area farthest from the hinge.

17. The hardware memory device of claim 16, wherein the program instructions, upon execution by the processor, further cause the IHS to apply a parallax adjustment to touch inputs received via the second display.

* * * * *